United States Patent
Tatourian et al.

(10) Patent No.: US 10,024,674 B2
(45) Date of Patent: Jul. 17, 2018

(54) PREDICTIVE TRANSPORTATION SYSTEM MODELING

(71) Applicant: Intel Corporation, Santa Clara, CA (US)

(72) Inventors: Igor A. Tatourian, Fountain Hills, AZ (US); Rita A. Wouhaybi, Portland, OR (US); Ansuya Negi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 14/978,972

(22) Filed: Dec. 22, 2015

(65) Prior Publication Data

US 2017/0176198 A1    Jun. 22, 2017

(51) Int. Cl.
| | | |
|---|---|---|
| *G01C 21/34* | (2006.01) | |
| *G01S 19/42* | (2010.01) | |
| *G01C 21/36* | (2006.01) | |

(52) U.S. Cl.
CPC ..... *G01C 21/3453* (2013.01); *G01C 21/3632* (2013.01); *G01S 19/42* (2013.01)

(58) Field of Classification Search
CPC .. G01C 21/3453; G01C 21/3622; G01S 19/42
See application file for complete search history.

(56) References Cited

U.S. PATENT DOCUMENTS

| | | | |
|---|---|---|---|
| 2015/0300834 A1* | 10/2015 | Shin ................... | G01C 21/3602 701/523 |
| 2016/0246298 A1* | 8/2016 | Sato ..................... | B60Q 9/00 |
| 2016/0287166 A1* | 10/2016 | Tran .................... | H04B 1/3827 |
| 2016/0357188 A1* | 12/2016 | Ansari ................ | G05D 1/0212 |

* cited by examiner

*Primary Examiner* — Richard M Camby
(74) *Attorney, Agent, or Firm* — Grossman, Tucker, Perreault & Pfleger, PLLC

(57) ABSTRACT

A plurality of vehicles may each include one or more biometric sensors capable of measuring at least one physiological factor and/or at least one psychological factor logically associated with at least one occupant of each vehicle. Each of the plurality of vehicles may also include at least one vehicular sensor to measure at least one vehicular factor and/or at least one ambient environmental sensor to measure at least one ambient environmental factor. A route guidance state machine receives the data indicative of the at least one physiological factor, at least one psychological factor, at least one vehicular factor, and/or at least one ambient environmental factor and determines a route for a first vehicle that minimizes the likelihood of contact with others in the plurality of vehicles exhibiting one or more unsafe actions.

25 Claims, 9 Drawing Sheets

PREDICTIVE TRANSPORTATION SYSTEM MODELING

TECHNICAL FIELD

The present disclosure relates to vehicular traffic safety systems and methods.

BACKGROUND

With increasing numbers of vehicles on an aging transportation infrastructure, driving aids such as global positioning system guidance, live traffic updates, collision-avoidance sensors, lane keeping assist systems and parking assist systems are found in increasing numbers. While these systems provide valuable information on routing, traffic, and other drivers in the immediate area around your vehicle, such systems are unable to consider the impact of driver behavior, in real-time, along the entire route from an origin to a destination.

As one travels to their destination, many different types of drivers may be encountered. Some drivers will be proceeding safely, obeying traffic laws, and adjusting their behavior to road conditions such as night driving, inclement weather, etc. On the other hand, some drivers may engage in behavior that is dangerous and more likely to cause a single- or multi-vehicle accident. Such drivers may be reckless teenagers, inexperienced drivers, impaired drivers, or simply a driver who is frustrated and in a bad mood. Current traffic safety systems are unable to detect this type of dangerous behavior and consequently are unable to address traffic safety until a vehicle is within the danger zone created by a distracted, impaired, inexperienced, or angry driver.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
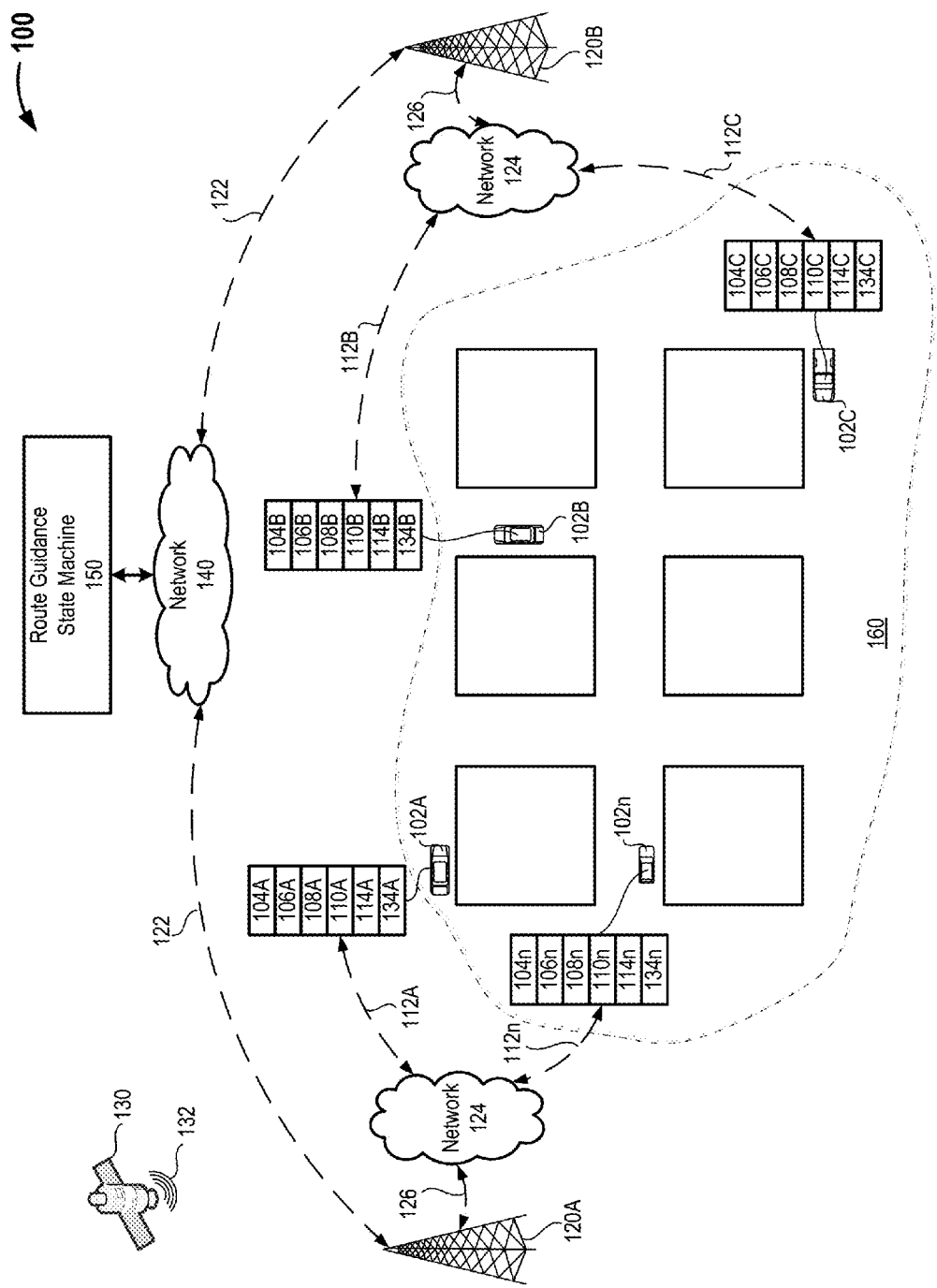
FIG. 1 provides a schematic of an illustrative predictive transportation system, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

A predictive transportation system may include a dynamic state machine that receives data in the form of motion vectors from each of a number of vehicles as inputs and overlays the motion vectors with emotional and behavioral data associated with one or more occupants of each of the vehicles. Using this data, the predictive transportation system may construct a model of the dynamic state of each vehicle and will predict interactions between vehicles all the way through to each vehicle's destination. In some implementations, the predictive transportation system can construct a probability of an accident along the entire route and may warn each driver of upcoming encounters with potentially dangerous drivers and/or road conditions. In some implementations, the predictive transportation system may also provide suggestions on tactics to avoid dangerous driving conditions by accelerating, decelerating, or even alternate routing to minimize the likelihood of contact with other vehicles.

In embodiments, at predefined intervals the predictive transportation system updates the dynamic state of the entire traffic system, taking into consideration the interaction of at least a portion of the vehicles in the traffic system and providing safe routing to each of the vehicles. In addition, the predictive transportation system may provide alerts such as where vehicle operators should pay particular attention to road conditions and other vehicles. Such information may also be relayed to autonomously operated/operating vehicles to assist in safe and expeditious routing of the autonomously operated vehicles.

Further, the predictive transportation system may assess emotional state and physical condition of the vehicle operator and other occupants in the vehicle and may include the emotional and physical in making routing decisions. The predictive transportation system may alert vehicle operators when their physical and/or emotional state compromises the safety of their vehicle or other vehicles within the traffic network. In the case of autonomous vehicles, the predictive transportation system may even take control of one or more operational aspects of a vehicle that the predictive transportation system has determined is operating in an unsafe manner. Each vehicle's driver assistance system will interact with the predictive transportation system to determine the probability that the vehicle operator may cause an accident or be involved in an accident caused by another vehicle with which their paths will intersect unless operating characteristics of the vehicle (e.g., speed, lane, and similar) are altered or changed.

A route guidance system is provided. The route guidance system may include a first sensor to acquire at least data representative of at least one of: a physical factor or a psychological factor logically associated with a respective occupant of each of a plurality of vehicles. The route guidance system may further include a route guidance state machine that generates one or more route guidance outputs in a first of the plurality of vehicles responsive to a receipt of at least the data indicative of at least one of: the one or more physical factors or the one or more psychological factors associated with a respective operator in each of the remaining plurality of vehicles.

A route guidance method is also provided. The route guidance method may include generating, via one or more biometric sensors, a first signal that includes data or information representative of at least one of a physical factor or a psychological factor logically associated with a respective occupant in each one of a plurality of vehicles. The route guidance method may also include receiving the first signal from each of the plurality of vehicles at a route guidance state machine. The route guidance method may also include generating, via the route guidance state machine, a route guidance output for a first of the plurality of vehicles responsive to the receipt of at least one of: the one or more physical factors or the one or more psychological factors associated with a respective operator in each of the remaining plurality of vehicles.

Another route guidance system is provided. The route guidance system may include a means for generating a first signal that includes data or information representative of at least one of a physical factor or a psychological factor logically associated with a respective occupant in each one of a plurality of vehicles. The route guidance system may also include a means for receiving the first signal from each of the plurality of vehicles. The route guidance system may also include a means for generating a route guidance output for a first of the plurality of vehicles responsive to the receipt of at least one of: the one or more physical factors or the one or more psychological factors associated with a respective operator in each of the remaining plurality of vehicles.

A storage device that includes machine-readable instructions is also provided. The machine-readable instructions, when executed by a controller, cause the controller to provide a route guidance state machine. The route guidance state machine may cause one or more biometric sensors to provide a first signal that includes data or information representative of at least one of a physical factor or a psychological factor logically associated with a respective occupant in each one of a plurality of vehicles. The route guidance state machine may receive the first signal from each of the plurality of vehicles at a route guidance state machine and generate a route guidance output for a first of the plurality of vehicles responsive to the receipt of at least one of: the one or more physical factors or the one or more psychological factors associated with a respective operator in each of the remaining plurality of vehicles.

FIG. 1 provides a schematic of an illustrative predictive transportation system 100 in which a dynamic route guidance state machine 150 receives occupant, vehicular, and environmental data from a number of vehicles 102A-102$n$ (collectively, "vehicles 102"), in accordance with at least one embodiment of the present disclosure. In embodiments, each of the vehicles 102A-102$n$ may include one or more respective biometric sensors 104A-104$n$ (collectively, "biometric sensors 104") that measure at least one physiological factor and/or psychological factor of at least one vehicle occupant and generates one or more signals containing data or information representative of the sensed physiological and/or psychological factors. In at least some instances, the biometric sensors 104 may measure at least one physiological factor and/or psychological factor of the vehicle operator and generates one or more signals containing data or information representative of the sensed physiological factor of the vehicle operator and/or psychological factor of the vehicle operator.

In embodiments, each of the vehicles 102A-102$n$ may include one or more respective vehicular sensors 106A-106$n$ (collectively, "vehicular sensors 106") that measure at least one vehicular operational factor, such as one or more vehicular systems, one or more vehicle operator inputs, or similar. In embodiments, each of the vehicles 102A-102$n$ may include one or more respective ambient environmental sensors 108A-108$n$ (collectively, "ambient environmental sensors 108") that measure at least one ambient environmental factor, such as weather conditions or road conditions. In embodiments, at least some of the vehicles 102 may include at least one geolocation system 134, such as a global positioning system (GPS), a global navigation satellite system (GLONASS), or a Galileo satellite system.

Each of the vehicles 102 may include a respective communication device 110A-110$n$ (collectively, "communication devices 110"). In some implementations, each of the communications devices 110 may include one or more transmitters, one or more receivers, one or more transceivers, or combinations thereof. In implementations, the one or more communication devices 110 may communicate one or more signals 112A-112$n$ (collectively, "signals 112") via one or more networks 124 to a communication system 120. In some implementations, the communication device 110 may include one or more transmitters, one or more receivers, one or more transceivers disposed in and carried by the respective vehicle 102. In some implementations, the communication device 110 may include one or more transmitters, one or more receivers, one or more transceivers carried by an occupant of the respective vehicle 102 (e.g., a cellular telephone carried by an occupant of the vehicle). The one or more signals 112 may include data representative of one or more physiological factors and/or psychological factors of at least one vehicle occupant, one or more vehicular factors, one or more ambient environmental factors, a global position of the vehicle, or any combination thereof.

The signals 112 from each of the vehicles 102 may be communicated in whole or in part via a network 124 to one or more communications systems 120A-120$n$ (collectively, "communication system 120"). In embodiments, the network 124 may facilitate the unidirectional or bi-directional transfer of information and/or data between some or all of the vehicles 102 and the communications system 120. The transfer of information and/or data via the network 124 may occur continuously, periodically aperiodically, or intermittently as vehicles 102 travel into and exit coverage regions provided by the communication system 120. The one or more networks 124 communicably coupling at least some of the vehicles 102 to the communication system 120 may include but are not limited to, one or more cellular networks (3G, 4G, 5G, LTE, etc.), one or more roadside or short range communication networks, one or more satellite communication networks, or combinations thereof.

In at least some implementations, the communication system 120 may include one or more wireless communication systems, one or more wired communication systems, or combinations thereof. For example, the communication system 120 may include a number of roadside transceivers that communicably couple one or more wireless communication network (e.g., a cellular network) to a wired communication network (e.g., a plain old telephone system or POTS). In some implementations, the network 124 may include, in whole or in part, one or more wireless local area networks (WLANs), one or more wireless metropolitan area networks (WMANs), one or more wireless wide area networks (WWANs), one or more global area networks (GANs), such as the Internet, or combinations thereof.

The communication system 120 may transfer some or all of the information and/or data received from the vehicles 102 to the route guidance state machine 150 via one or more network 140. In some implementations, the one or more networks 140 may include one or more cellular networks (3G, 4G, 5G, LTE, etc.), one or more wireless local area networks (WLANs), one or more wireless metropolitan area networks (WMANs), one or more wireless wide area networks (WWANs), one or more global area networks (GANs), such as the Internet, or combinations thereof.

The one or more biometric sensors 104 may include any current or future developed sensors, sensor combinations, or sensor arrays capable of detecting a physiological factor and/or a psychological factor associated with one or more occupants of a vehicle 102. The one or more biometric sensors 104 may include one or more contact sensors, one or more non-contact sensors, or combinations thereof. The one or more biometric sensors 104 may be disposed in locations throughout the vehicle 102, including one or more locations proximate the occupants of the vehicle 102, one or more locations remote from the occupants of the vehicle 102, or combinations thereof. In embodiments, some or all of the physio/psychological sensors 104 may include passive sensors that do not require only the presence of the vehicle occupant and require minimal or no interaction by the vehicle occupant with the biometric sensors 104.

Example biometric sensors 104 capable of sensing physical factors may include, but are not limited to, a respiration sensor, a heart sensor, a blood pressure sensor, a skin conductivity sensor, a skin reflectance sensor, a facial recognition sensor, a retina scanner, a blood alcohol sensor, an arterial or venous scanner, a fingerprint sensor, electrocardiogram sensors, brain wave sensors, a voice recognition sensor, eyelid scanners, or combinations thereof. Example biometric sensors 104 capable of sensing psychological factors may include, but are not limited to a voice stress analyzer, a blood pressure sensor, a skin conductivity sensor, or combinations thereof.

In some implementations, the one or more biometric sensors 104 may include a number of still and/or video image acquisition devices positioned to capture one or more occupants of the vehicle 102 and/or interactions between one or more occupants of the vehicle 102. Such image acquisition devices may be used to analyze facial characteristics, body position, body orientation, and similar physical parameters of one or more occupants. In such implementations, to address privacy considerations, some or all of the image data acquired by the image acquisition device may be analyzed by one or more on-board processor-based devices disposed within the vehicle 102. In some implementations, the by one or more remote processor based devices such as the route guidance state machine 150.

The one or more vehicular sensors 106 may include any current or future developed sensor, sensor combination, or sensor array capable of detecting one or more vehicular factors associated with the vehicle 102. The one or more vehicular sensors 106 may measure one or more vehicular factors and may generate one or more output signals that include information and/or data representative of or indicative of the measured vehicular factors. Example vehicular factors may include, but are not limited to, one or more aspects of one or more vehicular systems such as engine performance, exhaust performance, braking performance, cooling performance, fuel efficiency, and the like. Other example vehicular factors may include, but are not limited to, driver influenced vehicular parameters, such as brake position, throttle position, lateral acceleration, linear acceleration, on-board entertainment or comfort system use, and the like.

The one or more vehicular sensors 106 may be disposed in locations throughout the vehicle 102, including one or more locations proximate the occupants of the vehicle 102, one or more locations remote from the occupants of the vehicle 102, or combinations thereof. In embodiments, some or all of the vehicular sensors 106 may include passive sensors that do not require only the presence of the vehicle occupant and require minimal or no interaction by the vehicle occupant with the vehicular sensors 104.

The one or more ambient environmental sensors 108 may include any current or future developed sensor, sensor combination, or sensor array capable of detecting one or more ambient environmental factors in the area proximate the vehicle 102. The one or more ambient environmental sensors 108 may measure one or more ambient environmental factors and may generate one or more output signals that include information and/or data representative of or indicative of the measured ambient environmental factors. Example environmental factors may include, but are not limited to, one or more temperature sensors, one or more humidity sensors, one or more road surface sensors, one or more road condition sensors, one or more ambient light sensors, or combinations thereof.

Each of the vehicles 102A-102n may be equipped with one or more respective output devices 114A-114n (collectively, "output devices 114"). The one or more output devices 114 may include any current or future developed output devices 114 capable of providing a human-perceptible output. In embodiments, the output devices 114 may include one or more vehicular head units. In embodiments, the output devices 114 may include one or more audio output devices, one or more video output devices, or one or more audio/visual output devices. In some implementations, the one or more output devices 114 may be disposed within the vehicle 102 in a location accessible by the vehicle operator. In some implementations, the one or more output devices 114 may be disposed within the vehicle 102 in a location accessible by one or more occupants of the vehicle 102.

In some implementations, some or all of the vehicles 102 may include a geolocation receiver or transceiver 134A-134n (collectively, "geolocation receiver 134"). The one or more geolocation receivers 134 may receive signals 132 from one or more satellite 130 or terrestrial based geolocation systems. In some implementations, the one or more geolocation receivers 134 may generate one or more signals that include information or data representative of the geolocation of the vehicle 102 carrying the respective geolocation receiver 134. In some implementations, the geolocation information or data may be communicated by the communication device 110 to the route guidance state machine 150 along with information or data representative of the physical factors, psychological factors, vehicular factors, and/or ambient environmental factors logically associated with the respective vehicle 102.

The dynamic route guidance state machine 150 receives one or more signals that include data or information indicative of one or more physical factors, one or more psychological factors, one or more vehicular factors, and/or one or more ambient environmental factors from some or all of the vehicles 102 located within a geographic area 160. The geographic area 160 may be as small as a few city blocks or as large as the geopolitical boundary of a city, state, or country. In embodiments, the route guidance state machine 150 may include any number of processor-based devices and may be centrally located (e.g., a cloud based server system) or a distributed computing system (e.g., a distributed computing system that includes a processor-based device in each of the vehicles 102). The route guidance state machine 150 may generate route guidance information for some or all of the vehicles 102 based at least in part on the physical factor, psychological factor, vehicular factor, and ambient environmental factor data from some or all of the vehicles 102.

Advantageously, the route guidance state machine 150 is able to consider "human" factors such as the physical and/or emotional state of vehicle operators along the intended route and may offer or suggest alternative routing based on vehicle operators who engage in behaviors that demonstrate an increased likelihood of accidents or other unsafe vehicle operation. Further, access to a vehicle occupant's physical and/or psychological state may enable the route guidance state machine 150 to autonomously alert public safety and/or emergency response personnel upon detecting physical and/or psychological factors indicative of a medical emergency or accident. Yet further, the route guidance state machine 150 may assume control over one or more vehicle operations (e.g., speed, lane tracking) upon detecting physical and/or psychological factors indicative of a medical emergency involving a vehicle occupant.

Figure 2:
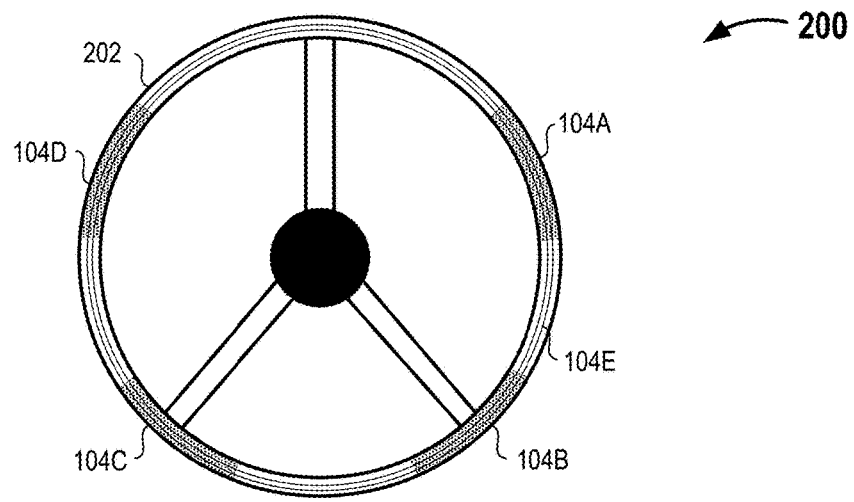
FIG. 2 provides an elevation of an example system that includes a steering wheel in which a number of biometric sensors have been disposed, in accordance with at least one embodiment of the present disclosure.

FIG. 2 depicts an elevation of an example system 200 that includes a steering wheel 202 in which a number of biometric sensors 104A-104n have been disposed, in accordance with at least one embodiment of the present disclosure. The steering wheel 202 may include a number of contact or non-contact biometric sensors 104A-104n. Beneficially, the steering wheel 202 may include a number of biometric sensors 104A-104n that require contact with the skin surface of the vehicle operator. The one or more biometric sensors 104A-104n may include, but are not limited to, one or more skin conductivity sensors, one or more pulse sensors, one or more blood pressure sensors, and the like.

In some implementations, some or all of the one or more biometric sensors 104A-104D may be disposed in localized areas or regions of the steering wheel 202, such as the locations on the steering wheel where vehicle operators typically rest their hands when operating the vehicle. In some implementations, some or all of the one or more biometric sensors 104E may be disposed continuously about all or a portion of the steering wheel 202.

Figure 3:
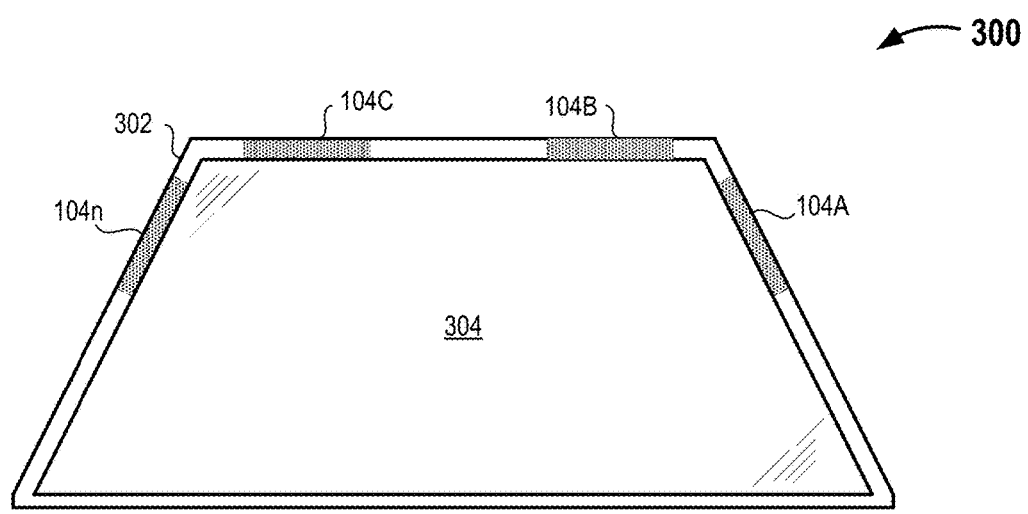
FIG. 3 provides an elevation of an illustrative vehicle windshield frame incorporating a number of biometric sensors, in accordance with at least one embodiment of the present disclosure.

FIG. 3 depicts an elevation of an example system 300 that includes a windshield frame 302 in which a number of biometric sensors 104A-104n have been disposed, in accordance with at least one embodiment of the present disclosure. The windshield frame 302 may partially or completely surround a windshield 304 or similar device. The windshield frame 302 may include a number of non-contact biometric sensors 104A-104n.

Figure 4:
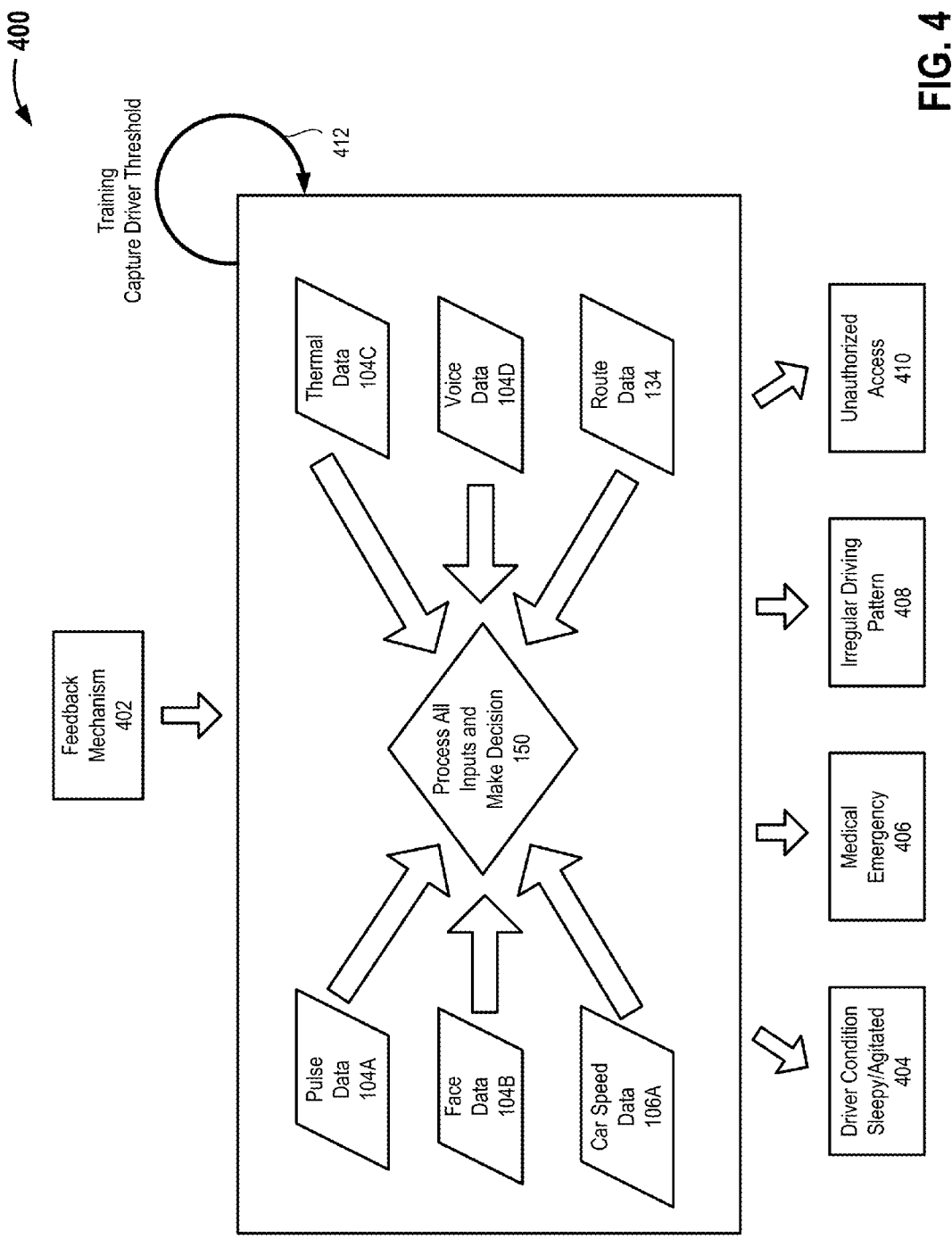
FIG. 4 provides a schematic of an illustrative biometric sensor and car data collection system for training and feedback of the predictive transportation system depicted in FIG. 1, in accordance with at least one embodiment of the present disclosure.

FIG. 4 depicts a schematic of an illustrative data collection system 400 for training the predictive transportation system 100 depicted in FIG. 1, in accordance with at least one embodiment of the present disclosure. In some implementations, data representative of one or more physical factors 104 and/or data representative of one or more psychological factors 104, one or more vehicular factors 106, and route data 134 may be provided to the route guidance state machine 150 in the form of one or more training data sets. In addition, feedback 402 may be provided to the route guidance state machine 150 to provide an on-going, dynamic, training environment that beneficially leverages "real word" data collected in real time or near-real time from a number of vehicles 102. In embodiments, data representative of vehicle occupant physical and/or psychological factors and/or data representative of one or more vehicular factors may be provided to the route guidance state machine 150. In addition to the data representative of vehicle occupant physical and/or psychological factors and/or data representative of one or more vehicular factors, data representative of one or more occupant and/or vehicular conditions may be provided to the route guidance state machine 150 in the form of one or more training data sets 412. Such data representative of vehicle occupant physical and/or psychological factors and/or data representative of one or more vehicular factors, when provided with data representative of one or more occupant and/or vehicular conditions, may permit the route guidance state machine 150 to recognize physical, psychological, and vehicular factors that characterize an impaired driver, unsafe operation of the vehicle 102, or similar conditions that compromise the safety and/or welfare of occupants in any vehicle. In addition, physical, psychological, vehicular, and ambient environment data collected on an ongoing basis may provide additional, ongoing or dynamic training for the route guidance state machine 150.

For example, one or more training data sets that include pulse data 104A, face data 104B, voice data 104D, and car speed data 106A may be provided to the route guidance state machine 150 to train the route guidance state machine 150 to recognize a vehicle operator in a sleepy or agitated condition 404. In another example, one or more training data sets that include pulse data 104A, thermal data 104C, and car speed data 106A may be provided to the route guidance state machine 150 to train the route guidance state machine 150 to recognize a vehicle operator who may be experiencing a medical emergency 406. In yet another example, one or more training data sets that include car speed data 106A and route data 134 may be provided to the route guidance state machine 150 to train the route guidance state machine 150 to recognize a vehicle operator who is engaging in an irregular driving pattern 408.

At times, the physical, psychological, vehicular, and ambient environment data may permit the route guidance state machine 150 to recognize instances of unauthorized use 410 of a vehicle 102. For example, face data 104B, voice data 104D, car speed data 106A, and route data 134 may be provided to the route guidance state machine 150 to train the route guidance state machine 150 to recognize a vehicle 102 of unauthorized use 410 of a vehicle 102.

Figure 5:
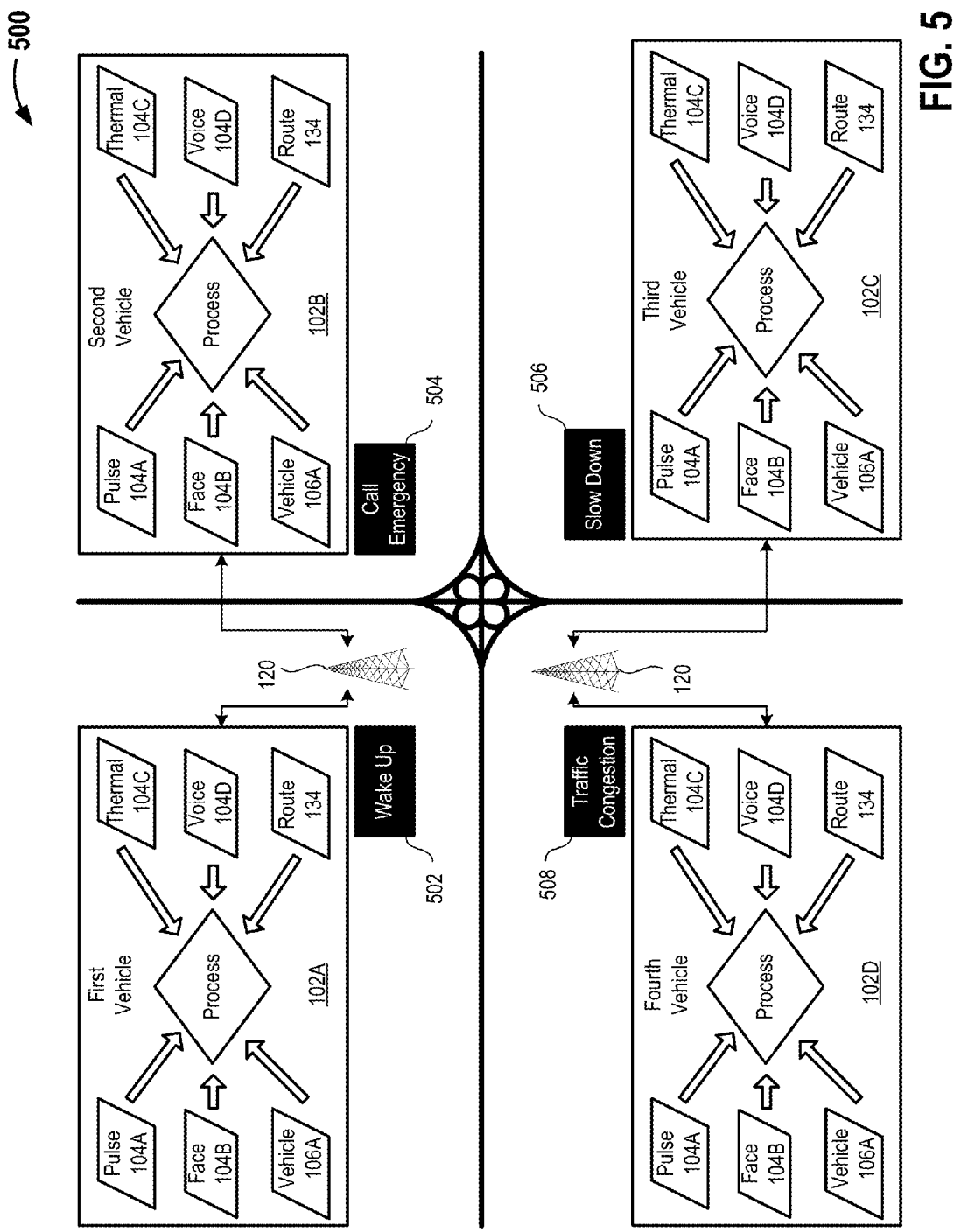
FIG. 5 provides a schematic of an illustrative feedback mechanism from roadside communication towers, in accordance with at least one embodiment of the present disclosure.

FIG. 5 provides a schematic of an illustrative feedback system 500 in which some or all of collected physical factor data, psychological factor data, vehicular data, and/or ambient environment data are analyzed by the route guidance state machine 150 and a communication system 120 provides feedback to each respective vehicle based on the collected data and the analysis performed by the route guidance state machine 150, in accordance with at least one embodiment of the present disclosure.

The physical factor data, psychological factor data, vehicular data, and geolocation data collected from any number of vehicles, including the first vehicle 102A, may be communicated to a route guidance state machine 150 via the communication system 120. The route guidance state machine 150 analyzes the data and provides feedback to the first vehicle 102A in the form of one or more recommendations, suggestions, or directives. The communication system 120 transmits the recommendations, suggestions, or directives provided by the route guidance state machine 150 to vehicle 102A.

As depicted in FIG. 5, the route guidance state machine 150 has transmitted a cautionary message 502 of "WAKE UP" to the occupant(s) of the first vehicle 102A. In one instance, the route guidance state machine 150 may warn that the operator of the first vehicle 102A is tired and steps should be taken to ensure the operator of the first vehicle 102A remains awake. In other instances, the route guidance state machine 150 may warn that the operator(s) of one or more other vehicles 102B-102n may be tired. Such a warning may provide the operator of the first vehicle 102A with a "heads-up" to watch for other vehicle operators whose decision making capabilities may be compromised by exhaustion. Such may permit the operator of the first vehicle to take appropriate corrective action (by slowing down, speeding up, taking an alternate route, changing lanes, etc.).

Beneficially, the recommendations, suggestions, or directives provided by the route guidance state machine 150 to the first vehicle 102A may be based wholly or in part on one or more factors logically associated with either or both the first vehicle 102A and/or one or more factors logically associated with other vehicles that may be or have the future potential to be proximate the first vehicle 102A. Thus, the route guidance state machine 150 is able to provide guidance and recommendations based not only on the physical and/or psychological factors logically associated with one or more occupants in vehicle 102A, but also on the physical and/or psychological factors logically associated with one or more occupants in other vehicles who are traveling along or will be traveling along the current and/or proposed route of the first vehicle 102A.

In another embodiment, the route guidance state machine 150 has transmitted a cautionary message of "CALL EMERGENCY" to the occupant(s) of the second vehicle 102B. The route guidance state machine 150 may warn that the operator of the second vehicle 102B is in a compromised medical condition (heart condition, diabetic condition, etc.) and appropriate action should be taken. Such may permit the operator of the second vehicle 102B to take appropriate corrective action (by slowing down, speeding up, taking an alternate route, changing lanes, etc.). In embodiments where the second vehicle 102B may be an autonomously driven vehicle, the second vehicle 102B may take appropriate action, such as slowing and pulling to the side of the road while contacting emergency services. In some instances, the route guidance state machine 150 may communicate some or all of the acquired physical factor data to the responding emergency services to provide advance information on the condition of the vehicle occupant(s).

In yet another embodiment, the route guidance state machine 150 has transmitted a cautionary message 506 of "SLOW DOWN" to the occupant(s) of a third vehicle 102C. In some instances, based on the data representative of the vehicle speed 106A and/or one or more ambient environmental factors, the route guidance state machine 150 may warn that the operator of the third vehicle 102C is operating the third vehicle 102C in excess of a safe speed for the environmental conditions. In other instances, the route guidance state machine 150 may warn that the operator of the third vehicle 102C of an upcoming event, such as road construction or an accident that causes a traffic slowdown. Such a warning may provide the operator of the third vehicle 102C with a "heads-up" to either reduce the speed of the third vehicle to a speed safe for the current ambient conditions or to watch for slowed traffic. Such may permit the operator of the third vehicle 102C to take appropriate corrective action by slowing the speed of the third vehicle.

Once again, the recommendations, suggestions, or directives provided by the route guidance state machine 150 to the third vehicle 102C may be based wholly or in part on factors logically associated with either or both the third vehicle 102C and/or factors logically associated with other vehicles 102 that may be or have the future potential to be proximate the third vehicle 102C. Thus, the route guidance state machine 150 is able to provide guidance and recommendations based not only on the vehicular and ambient environmental factors logically associated with the third vehicle 102C, but also the vehicular and ambient environmental factors logically associated with other vehicles who are traveling along or will be traveling along the current and/or proposed route of the third vehicle 102C.

In yet another embodiment, the route guidance state machine 150 has transmitted a cautionary message 508 of "TRAFFIC CONGESTION" to the occupant(s) of a fourth vehicle 102D. In some instances, based on the vehicular factor data (e.g., vehicle speed 106A) and/or ambient environmental factor data, the route guidance state machine 150 may warn that the operator of the fourth vehicle 102D is operating the vehicle in excess of a safe speed for upcoming traffic conditions. Such a warning may provide the operator of the fourth vehicle 102D with a "heads-up" to either reduce the speed of the vehicle to a safe speed. Such may permit the operator of the fourth vehicle 102D to take appropriate corrective action by reducing speed.

Once again, the recommendations, suggestions, or directives provided by the route guidance state machine 150 to the fourth vehicle 102D may be based wholly or in part on factors logically associated with either or both the fourth vehicle 102D and/or factors logically associated with other vehicles 102 that may be or have the future potential to be proximate the fourth vehicle 102D. Thus, the route guidance state machine 150 is able to provide guidance and recommendations based not only on the vehicular and ambient environmental factors logically associated with the fourth vehicle 102D, but also the vehicular and ambient environmental factors logically associated with other vehicles who are traveling along or will be traveling along the current and/or proposed route of the fourth vehicle 102D.

Figure 6:
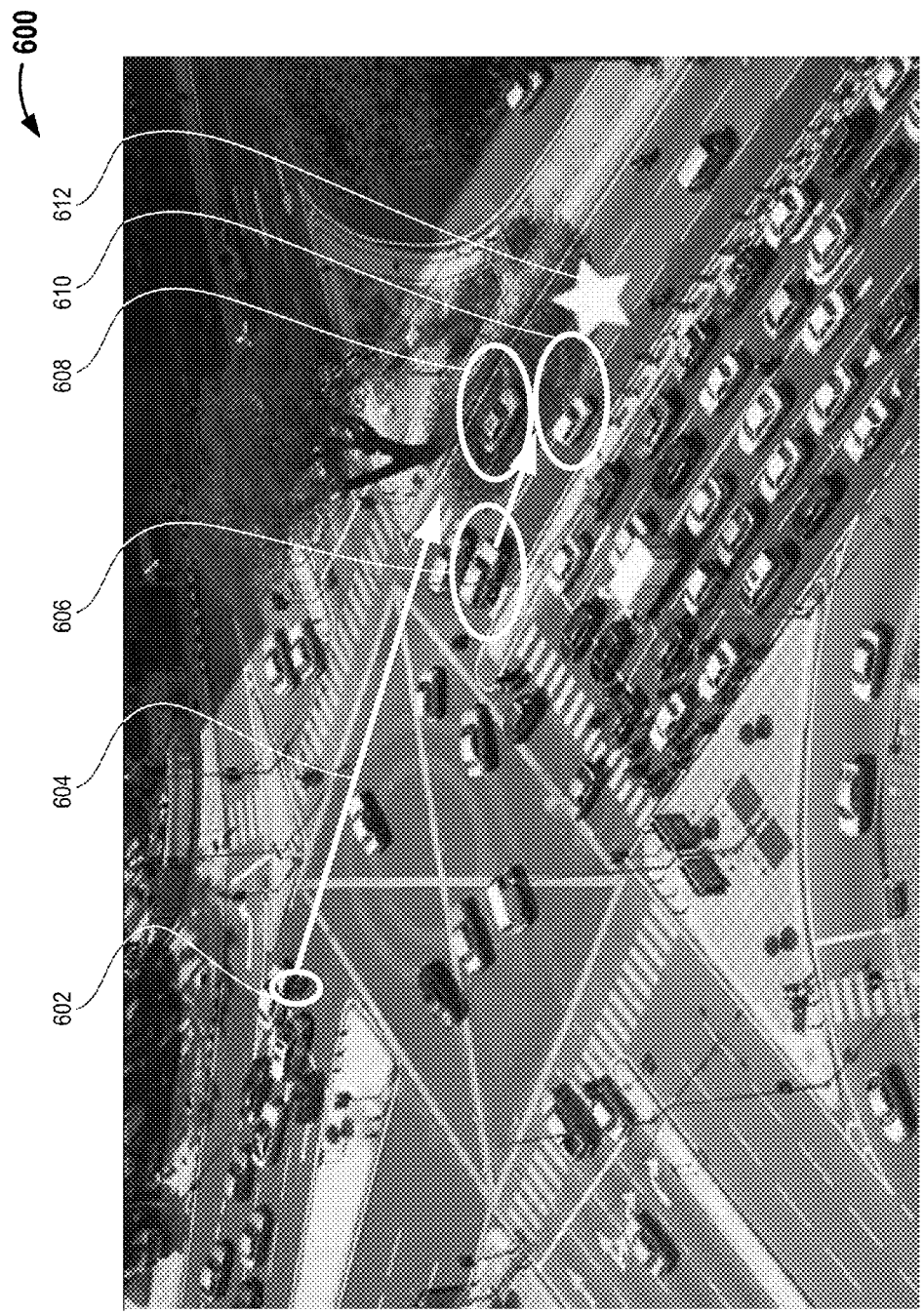
FIG. 6 provides an illustrative example of the route guidance state machine output, in accordance with at least one embodiment of the present disclosure.

FIG. 6 provides an illustrative example 600 of the route guidance state machine output, in accordance with at least one embodiment of the present disclosure. As depicted in FIG. 6, the route guidance state machine 150 may predict that the motorcycle in circle 602 will accelerate 604 at a rate that exceeds the acceleration rate of the vehicles in circles 606, 608, and 610 based on one or more physical factors, psychological factors, and/or vehicular factors of the motorcycle operator. Further, based on one or more physical factors, psychological factors, and/or vehicular factors of the motorcycle operator the route guidance state machine 150 may predict the motorcycle operator will attempt to cut in front of the three vehicles 606, 608, and 610. Based on one or more physical factors, psychological factors, and/or vehicular factors logically associated with the operator of the motorcycle 602 and the one or more physical factors, psychological factors, and/or vehicular factors logically associated with the operators of the vehicles 606, 608, and 610, the route guidance state machine 150 may predict a potential collision point 612 exists and is designated by the star in FIG. 6.

Based on the predicted collision point at 612, the route guidance state machine 150 may communicate one or more messages to the operator of the motorcycle 602 and one or more messages to the operators of each of the three vehicles 606, 608, and 610. In embodiments, the same message, warning of the potential collision point at 612, may be communicated to the operator of the motorcycle 602 and the operators of each of the three vehicles 606, 608, and 610. In other embodiments, different messages may be sent to some or all of the operator of the motorcycle 602 and the operators of each of the three vehicles 606, 608, and 610. For example, the route guidance state machine 150 may provide a message to the operator of the motorcycle 602 advising the operator to slow down. The route guidance state machine 150 may provide messages to the operator of each of the vehicles 606, 608, and 610 warning of the potential collision at 612 and requesting the operator of each of the vehicles 606, 608, and 610 to yield to the motorcycle 602 that will be passing their respective vehicles in 20 seconds. In some implementations, the route guidance state machine 150 may take control of one or more aspects of one or more of the three vehicles 606, 608, and 610 to avert the collision at 612.

Figure 7:
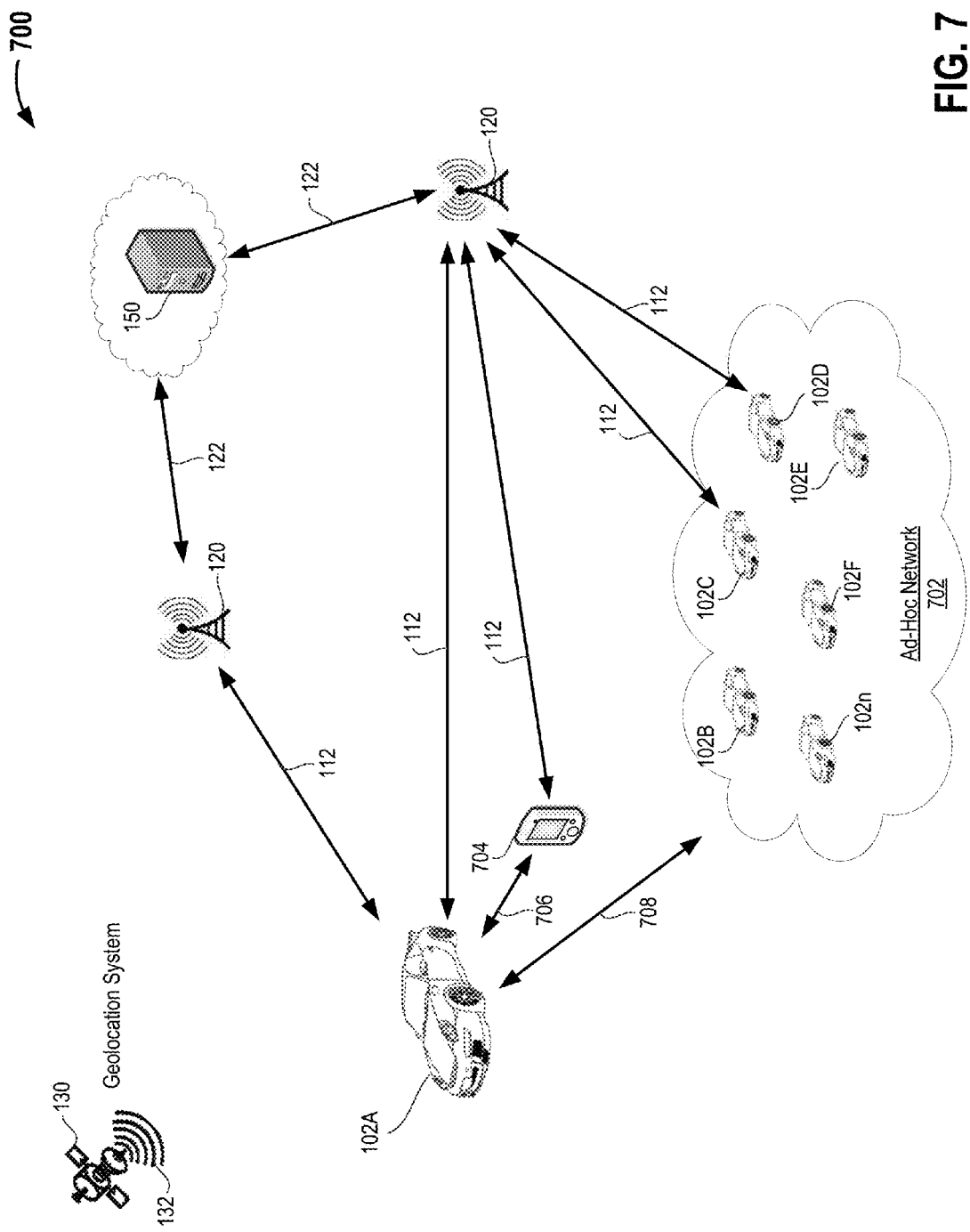
FIG. 7 provides a schematic of an illustrative transportation system, in accordance with at least one embodiment of the present disclosure.

FIG. 7 is a schematic diagram of an illustrative transportation system 700 that includes a route guidance state machine 150 bidirectionally communicably coupled with an ad-hoc mesh network 702 of vehicles 102, in accordance with at least one embodiment of the present disclosure. As depicted in FIG. 7, the route guidance state machine 150 may be a cloud-based device communicably coupled to each of the vehicles 102. In some implementations, at least a portion of the vehicles 120 may be unidirectionally or bidirectionally communicably coupled 708 together as an ad-hoc, mesh network 702 in which at least some of the physical factor data, psychological factor data, vehicular factor data, and/or ambient environmental factor data may be shared between at least a portion of the vehicles 102 forming the ad-hoc, mesh network 702.

In at least some implementations, some or all of the physical factor data, psychological factor data, vehicular factor data, and/or ambient environmental factor data may be communicated via one or more communications devices 110 disposed in the vehicles 102 forming the ad-hoc mesh network 702. In other implementations, some or all of the physical factor data, psychological factor data, vehicular factor data, and/or ambient environmental factor data may be communicated to the communication system 120 via an intermediary device, such as one or more handheld communication devices 704. Examples of such handheld or portable communications devices 704 may include, but are not limited to: cellular telephones and smartphones. In some instances, the handheld or portable communications device 704 may be communicably coupled 706 to a vehicle 102 via one or more short range wireless protocols such as near field communication (NFC) or BLUETOOTH®.

Figure 8:
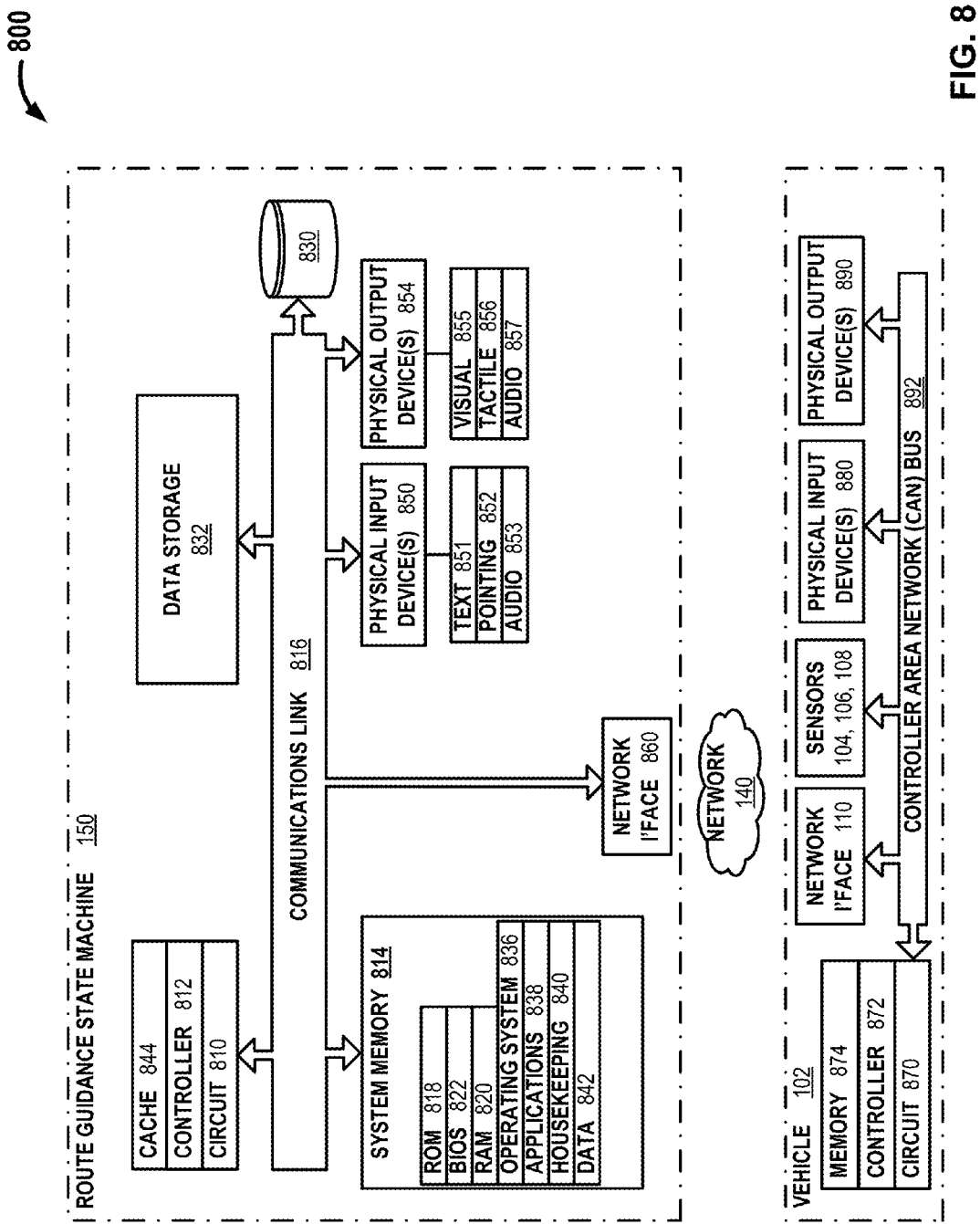
FIG. 8 provides a block diagram of an example system on which the predictive transportation system may be implemented, in accordance with at least one embodiment of the present disclosure.

FIG. 8 and the following discussion provide a brief, general description of the components forming an illustrative system 800 that includes one or more controllers 812 in which the various illustrated embodiments of the route guidance state machine 150 may be implemented. Although not required, some portion of the embodiments will be described in the general context of machine-readable or computer-executable instruction sets, such as program application modules, objects, or macros being executed by the one or more controllers 812. Those skilled in the relevant art will appreciate that the illustrated embodiments as well as other embodiments can be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The route guidance state machine 150 may take the form of one or more circuits 810 including electronic and/or semiconductor components that are disposed partially or wholly in a personal computer, mainframe computer, distributed computing system, server, blade server, workstation, or other similar current or future computing systems capable of executing machine-readable instructions. The route guidance state machine 150 includes one or more circuits 810, and may, at times, include a communications link 816 that communicably couples various system components including a system memory 814 to the one or more circuits 810. The route guidance state machine 150 will at times be referred to in the singular herein, but this is not intended to limit the embodiments to a single system, since in certain embodiments, there will be more than one route guidance state machine 150 or other networked systems, circuits, or devices involved.

The circuit 810 may include any number, type, or combination of devices. At times, the circuit 810 may be implemented in whole or in part in the form of semiconductor devices such as diodes, transistors, inductors, capacitors, and resistors. Such an implementation may include, but is not limited to any current or future developed single- or multi-core processor or microprocessor, such as: one or more systems on a chip (SOCs); one or more central processing units (CPUs); one or more digital signal processors (DSPs); one or more graphics processing units (GPUs); one or more application-specific integrated circuits (ASICs), one or more field programmable gate arrays (FPGAs), and the like. Unless described otherwise, the construction and operation of the various blocks shown in FIG. 7 are of conventional design. As a result, such blocks need not be described in further detail herein, as they will be understood by those skilled in the relevant art. The communications link 816 that interconnects at least some of the components of the example route guidance state machine 150 may employ any known bus structures or architectures.

The system memory 814 may include read-only memory ("ROM") 818 and random access memory ("RAM") 820. A portion of the ROM 818 may contain a basic input/output system ("BIOS") 822. The BIOS 822 may provide basic functionality to the route guidance state machine 150, for example by causing the one or more circuits 810 to load one or more machine-readable instruction sets that cause the one or more circuits 810 to provide and function as a particular and specialized route guidance controller 812. The route guidance state machine 150 may include one or more communicably coupled, non-transitory, data storage devices 832. The one or more data storage devices 832 may include any number and/or combination of any current or future developed non-transitory storage devices. Non-limiting examples of such non-transitory, data storage devices 832 may include, but are not limited to one or more magnetic storage devices, one or more optical storage devices, one or more solid-state electromagnetic storage devices, one or more electroresistive storage devices, one or more molecular storage devices, one or more quantum storage devices, or various combinations thereof.

The one or more storage devices 832 may include interfaces or controllers (not shown) communicatively coupling the respective storage device(s) or system(s) to the communications link 816, as is known by those skilled in the art. The one or more storage devices 832 may contain machine-readable instruction sets, data structures, program modules, and other data useful to the route guidance state machine 150. In some instances, one or more external storage devices 830 may be communicably coupled to the route guidance controller 812, for example via one or more tethered or wireless networks.

Machine-readable instruction sets and/or applications 838 and housekeeping instruction sets 840 may be stored or otherwise retained in whole or in part in the system memory 814. Such instruction sets may be transferred from one or more storage devices 832 and/or one or more external storage devices 830 and stored in the system memory 814 in whole or in part for execution by the one or more circuits 810. The machine-readable instruction sets 838 may include instructions and/or logic providing the dynamic route guidance functions and capabilities described herein.

For example, one or more machine-readable instruction sets 838 may cause the route guidance controller 812 to collect physical factor data, psychological factor data, vehicular factor data, and/or ambient environment factor data for at least a portion of the vehicles 102. The one or more machine-readable instruction sets 838 may cause the route guidance state machine 150 to implement one or more artificial intelligence ("AI") methods including, but not limited to, one or more hybrid neural networks or recurrent neural networks to analyze the collected physical factor data, psychological factor data, vehicular factor data, and/or ambient environment factor data for each vehicle 102 and predict the behavior of the respective vehicle 102 and/or one or more occupants of the respective vehicle 102 (e.g., the operator of the vehicle). The one or more machine-readable instruction sets 838 may cause the route guidance state machine 150 to implement one or more machine learning algorithms, for example to establish and/or weight connections within a neural network used to predict the behavior of vehicles 102 and/or occupants of vehicles 102.

In some implementations, the one or more machine-readable instruction sets 838 may cause the route guidance state machine 150 to provide some or all of the vehicles 102 with route guidance information, informational alerts, and/or warnings based at least in part on the collected physical factor data, psychological factor data, vehicular factor data, and/or ambient environment factor data for at least some of the vehicles 102. For example, the route guidance state machine 150 may provide an initial routing for a vehicle based at least in part on the intended destination of the respective vehicle 102. Such an initial routing may take into consideration factors such as traffic, accidents, and construction—and, may additionally take into consideration driver behavior in making the final route determination.

The route guidance state machine 150 advantageously provides a system that doesn't necessarily provide the shortest or fastest route, but instead beneficially determines the "safest" route based on driving conditions and the behavior of other vehicle operators. Thus, if a particular road or stretch of road includes a number of vehicle operators operating their vehicles in an unsafe manner (e.g., high speed, rapid lane changes, physical/psychological signs of high levels of aggression or stress, or similar), the route guidance state machine 150 may suggest an alternate route that may be longer distance or may require additional time, but reflects a desired level of safety in the routing. In some implementations, a vehicle operator may specify such desired level of safety which may then be taken into consideration by the route guidance state machine 150 when determining the routing.

The route guidance state machine 150 may include one or more communicably coupled physical input devices 850, such as one or more text entry devices 851 (e.g., keyboard), one or more pointing devices 852 (e.g., mouse, trackball, touchscreen), and/or one or more audio input devices 853. Such physical input devices 850 may be used, for example, to provide, enter, or otherwise supply commands (e.g., acknowledgements, selections, confirmations, and similar) as well as information (e.g., subject identification information, color parameters) to the route guidance state machine 150. Some or all of the physical input devices 850 may be disposed remote from and communicably coupled to the route guidance state machine 150.

The route guidance state machine 150 may include one or more communicably coupled physical output devices 854, such as one or more display devices 755, one or more tactile output devices 856, one or more audio output devices 857, or any combination thereof. Some or all of the physical output devices 854 may be disposed remote from and communicably coupled to the route guidance state machine 150.

For convenience, the network interface 860, the one or more circuits 810, the system memory 814, the physical input devices 850 and the physical output devices 854 are illustrated as communicatively coupled to each other via the communications link 816, thereby providing connectivity between the above-described components. In alternative embodiments, the above-described components may be communicatively coupled in a different manner than illustrated in FIG. 8. For example, one or more of the above-described components may be directly coupled to other components, or may be coupled to each other, via one or more intermediary components (not shown). In some embodiments, communications link 816 is omitted and the components are coupled directly to each other using suitable wired or wireless connections.

Each vehicle 102 may include one or more circuits 870 capable of executing one or more machine-readable instruction sets to provide one or more vehicular system controllers 872. In at least some implementations, the one or more vehicular system controllers 872 may be disposed in a vehicle head unit or similar structure. At times, some or all of the machine-readable instruction sets may be stored or otherwise retained in a system memory 874 communicably coupled to the controller 872. The system memory 874 may include read only memory (ROM), random access memory (RAM), or combinations thereof. The read only memory (ROM) may include a basic input/output system (BIOS).

Each vehicle 102 may include one or more physical input devices 880. The one or more physical input devices 880 may include one or more text input devices (e.g., a hard or "soft" keyboard or similar alphanumeric input device), one or more pointing input devices (e.g., a touchscreen, touchpad, or joystick), one or more sound activated input devices (e.g., a voice command input device), or combinations thereof. In some implementations, the one or more physical input devices 880 may be used by a vehicle occupant to provide instructions or feedback to the route guidance state machine 150. The one or more physical input devices 880 may be communicably coupled to the vehicular system controller 872 via one or more buses 892, such as a controller area network or CAN bus.

Each vehicle 102 may also include one or more physical output devices 890. The one or more physical output devices 890 may include one or more graphical output devices, one or more tactile output devices, one or more audible output devices, or combinations thereof. In some implementations, the one or more physical output devices 890 may be used by the route guidance state machine 150 to provide information or data, such as routing data, to one or more occupants of the vehicle 102. The one or more physical output devices 890 may be communicably coupled to the vehicular system controller 872 via one or more buses 892, such as a controller area network or CAN bus.

Figure 9:
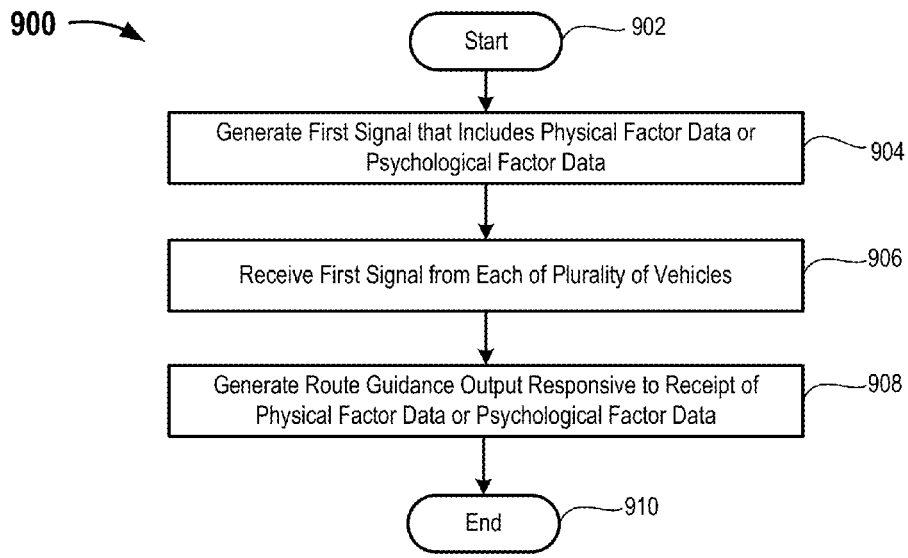
FIG. 9 is a high-level logic flow diagram of an illustrative predictive transportation method using physical and/or psychological data associated with a vehicle occupant, in accordance with at least one embodiment of the present disclosure.

FIG. 9 is a high-level logic flow diagram of an illustrative predictive transportation method 900 using physical factor data and/or psychological factor data logically associated with at least one vehicle occupant, in accordance with at least one embodiment of the present disclosure. The route guidance state machine 150 receives physical factor data and/or psychological factor data from any number of vehicles 102. Using at least the received physical factor data and/or psychological factor data the route guidance state machine 150 determines route guidance to reduce the likelihood of accidents. The method 900 commences at 902.

At 904, one or more biometric sensors 104 generate a number of signals that include physical factor data and/or psychological factor data.

At 906, the route guidance state machine 150 receives the signals that include physical factor data and/or psychological factor data logically associated with at least one vehicle occupant from each of the vehicles 102A-102n. In some implementations, the physical factor data and/or psychological factor data received by the route guidance state machine 150 may include physical factor data and/or psychological factor data logically associated with an operator of the respective vehicle 102.

At 908, the route guidance state machine 150 generates an output that is communicated to at least a portion of the vehicles 102A-102n. In some implementations, the route guidance state machine 150 determines a separate or individual routing for each respective one or the vehicles 102A-102n. The route guidance output communicated from the route guidance state machine 150 to a first vehicle 102A may include information and/or data indicative of one or more defined routes determined based, at least in part, on the physical factor data and/or psychological factor data received from at least a portion of the other vehicles 102B-102n. Such may advantageously permit the route guidance state machine 150 to determine a route for vehicle 102A that avoids or minimizes the likelihood of contact with other vehicles 102B-102n that are operated in an unsafe manner. Thus, the route guidance state machine 150 provides route guidance that is based, at least in part, on the actions of other vehicle operators as well as other factors such as traffic, construction, congestion, and the like. The method 900 concludes at 910.

Figure 10:
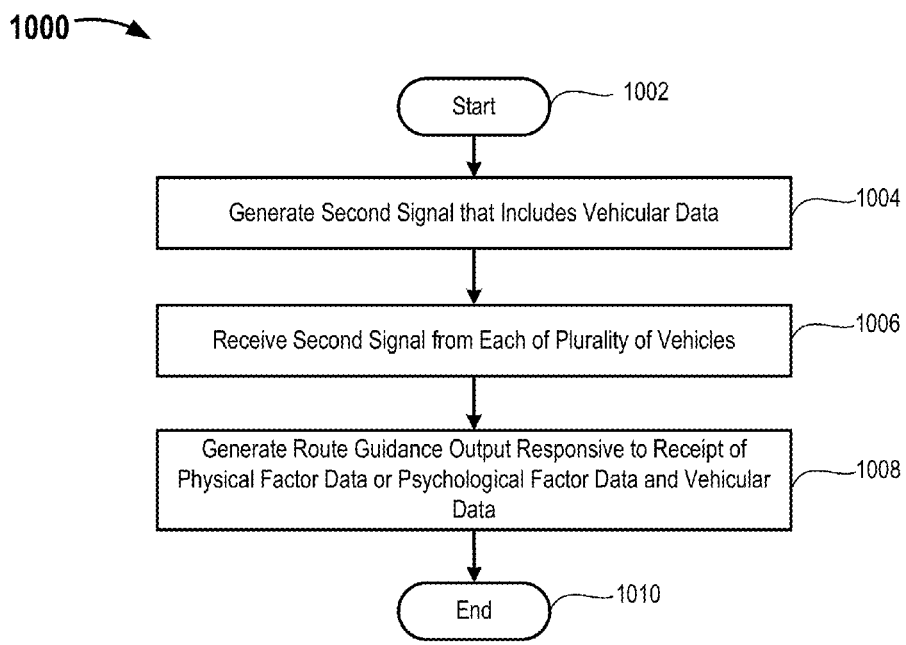
FIG. 10 is a high-level logic flow diagram of an illustrative predictive transportation method using physical and/or psychological data associated with a vehicle occupant and vehicular data associated with a vehicle, in accordance with at least one embodiment of the present disclosure.

FIG. 10 is a high-level logic flow diagram of an illustrative predictive transportation method 1000 using vehicular factor data logically associated with a vehicle 102, in accordance with at least one embodiment of the present disclosure. The route guidance state machine 150 receives vehicular factor data from each respective one of any number of vehicles 102. Using at least received physical factor data, psychological factor data, and vehicular factor data the route guidance state machine 150 determines route guidance to reduce the likelihood of accidents and/or the likelihood of interaction with vehicles 102 operated or being operated in an unsafe manner. The method 1000 commences at 1002.

At 1004, one or more vehicular factor sensors 104 disposed within a vehicle 102 generate at least one signal that includes vehicular factor data. Such vehicular factor data may include, but is not limited to, information and/or data logically associated with one or more parameters of one or more vehicular devices, components, or systems. Example vehicular factor data includes throttle position data, braking data, lateral acceleration data, linear acceleration data, steering input data, collision avoidance data, blind spot monitoring data, tire tread depth data, brake rotor and brake pad data, and the like.

At 1006, the route guidance state machine 150 receives the signals that include vehicular factor data logically associated each of the vehicles 102A-102n.

At 1008, the route guidance state machine 150 generates an output that is communicated to at least a portion of the vehicles 102A-102n. In some implementations, the route guidance state machine 150 determines a separate or individual routing for each respective one or the vehicles 102A-102n. The route guidance output communicated from the route guidance state machine 150 to a first vehicle 102A may include information and/or data indicative of one or more defined routes determined based, at least in part, on the physical factor data, psychological factor data, and the vehicular factor data received from at least a portion of the other vehicles 102B-102n. The route guidance state machine 150 provides route guidance that is based, at least in part, on the actions of other vehicle operators as well as other factors such as traffic, construction, congestion, and the like. The method 1000 concludes at 1010.

Figure 11:
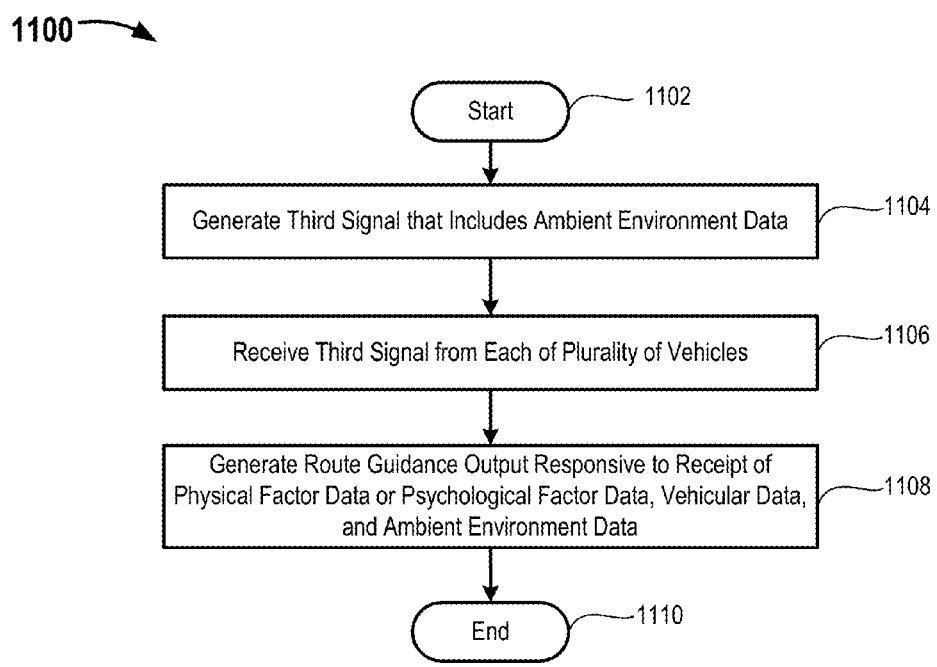
FIG. 11 is a high-level logic flow diagram of an illustrative predictive transportation method using physical and/or psychological data associated with a vehicle occupant, vehicular data associated with a vehicle, and ambient environmental data associated with a vehicle, in accordance with at least one embodiment of the present disclosure.

FIG. 11 is a high-level logic flow diagram of an illustrative predictive transportation method 1100 using ambient environmental factor data logically associated with a vehicle 102, in accordance with at least one embodiment of the present disclosure. The route guidance state machine 150 receives ambient environmental factor data from each respective one of any number of vehicles 102. Using at least received physical factor data, psychological factor data, and/or ambient environmental factor data the route guidance state machine 150 determines route guidance to reduce the likelihood of accidents and/or the likelihood of interaction with vehicles 102 operated or being operated in an unsafe manner. The method 1100 commences at 1102.

At 1104, one or more ambient environmental factor sensors 104 generate at least one signal that includes ambient environmental factor data. Such ambient environmental factor data may include, but is not limited to, information and/or data logically associated with one or more environmental conditions external to each of the vehicles 102. Example ambient environmental factor data includes ambient temperature, humidity, precipitation, road surface material, road condition, and the like.

At 1106, the route guidance state machine 150 receives the signals that include ambient environmental factor data logically associated each of the vehicles 102A-102n.

At 1108, the route guidance state machine 150 generates an output that is communicated to at least a portion of the vehicles 102A-102n. In some implementations, the route guidance state machine 150 determines a separate or individual routing for each respective one or the vehicles 102A-102n. The route guidance output communicated from the route guidance state machine 150 to a first vehicle 102A may include information and/or data indicative of one or more defined routes determined based, at least in part, on the physical factor data, psychological factor data, and the ambient environmental factor data received from at least a portion of the other vehicles 102B-102n. The route guidance state machine 150 provides route guidance that is based, at least in part, on the actions of other vehicle operators as well as other factors such as traffic, construction, congestion, and the like. The method 1100 concludes at 1110.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for binding a trusted input session to a trusted output session to prevent the reuse of encrypted data obtained from prior trusted output sessions.

According to Example 1, there is provided a route guidance system. The route guidance system may include a sensor network disposed in each of a plurality of vehicles, each of the sensor networks including at least a first number of biometric sensors to acquire data indicative of a physical factor or a psychological factor of at least one occupant of the vehicle. The route guidance system may include a wireless data interface in each of the plurality of vehicles, the wireless data interface communicably coupled to the sensor network. The route guidance system may include at least one output device disposed in each of the plurality of vehicles, the at least one output device communicably coupled to the sensor network. The route guidance system may also include at least one circuit capable of executing machine-readable instructions that cause the circuit to provide a route guidance state machine, the route guidance state machine to: receive the data indicative of the physical factor or psychological factor of the at least one occupant for each respective one of the plurality of vehicles and, for a first of the plurality of vehicles, generate via the at least one output device route guidance information based at least in part on the physical factor or psychological factor of the at least one occupant in each respective one of the remaining plurality of vehicles.

Example 2 may include elements of example 1 where the sensor network may further include at least one geolocation sensor and where the route guidance state machine may further receive data indicative of a geolocation of the respective vehicle for each respective one of the plurality of vehicles and generate, via the at least one output device, route guidance information based at least in part on the physio/psychological state of the at least one occupant in each respective one of the remaining plurality of vehicles and the geolocation of each of the remaining plurality of vehicles.

Example 3 may include elements of example 2 where the sensor network may further include a second number of vehicular sensors to acquire data indicative of at least one operational factor of the vehicle and where the route guidance state machine may further: receive the data indicative of the at least one operational factor of the respective vehicle for each respective one of the plurality of vehicles and generate, via the at least one output device, route guidance information based at least in part on the physio/psychological factor of the at least one occupant in each respective one of the remaining plurality of vehicles and the at least one operational factor of each of the remaining plurality of vehicles.

Example 4 may include elements of example 3 where the second number of vehicular sensors may include at least one sensor to acquire data indicative of an operational factor of a vehicle, including at least one of: steering input, accelerator position, braking position, lateral acceleration, lane tracking, intra-vehicular distance, and linear acceleration.

Example 5 may include elements of example 3 where the sensor network may further include a third number of environmental sensors to acquire data indicative of at least one environmental factor external to the vehicle and where the route guidance state machine may further receive the data indicative of the at least one environmental factor external to the respective vehicle for each respective one of the plurality of vehicles and generate, via the at least one output device, route guidance information based at least in part on the physio/psychological factor of the at least one occupant in each respective one of the remaining plurality of vehicles and the respective at least one environmental factor external to each of the remaining plurality of vehicles.

Example 6 may include elements of example 5 where the third number of environmental sensors may include at least one sensor to acquire data indicative of an environmental factor external to a vehicle, including at least one of: temperature, humidity, road surface conditions, ambient light, and road composition.

Example 7 may include elements of example 1 where the first number of biometric sensors may include at least one sensor to acquire data indicative of a physio/psychological factor of the at least one occupant of the vehicle that includes at least one of: a heart rate measurement; a body temperature, a blood alcohol measurement, a respiration measurement, a skin conductivity measurement; a facial recognition; a retinal scan; a fingerprint scan, a voice identification, and a skin reflection measurement.

Example 8 may include elements of example 1 where the first number of biometric sensors may acquire data indicative of a physio/psychological factor of at least an operator of the vehicle.

Example 9 may include elements of example 8 where the first number of biometric sensors may acquire additional data indicative of a physio/psychological factor of at least one passenger in the vehicle.

Example 10 may include elements of example 1 where the at least one circuit may include a network device disposed remote from the plurality of vehicles.

Example 11 may include elements of example 1 where the at least one circuit may include a plurality of circuits that collectively provide the route guidance state machine, each of the plurality of circuits disposed in a respective one of the plurality of vehicles.

According to Example 12, there is provided a route guidance system. The route guidance system may include a first sensor to acquire at least data representative of at least one of: a physical factor or a psychological factor logically associated with a respective occupant of each of a plurality of vehicles. The route guidance system may also include a route guidance state machine that generates one or more route guidance outputs in a first of the plurality of vehicles responsive to a receipt of at least the data indicative of at least one of: the one or more physical factors or the one or more psychological factors associated with a respective operator in each of the remaining plurality of vehicles.

Example 13 may include elements of example 12, and may additionally include a second sensor to acquire at least data representative of one or more vehicular factors logically associated with each respective one of the plurality of vehicles, where the route guidance state machine may further generate one or more route guidance outputs in the first of the plurality of vehicles responsive to a receipt of at least the data representative of the one or more vehicular factors from each respective one of the remaining plurality of vehicles.

Example 14 may include elements of example 13, and may additionally include a third sensor to acquire at least data representative of one or more environmental factors external to, and logically associated with, each respective one of the plurality of vehicles, where the route guidance state machine may further generate one or more route guidance outputs in the first of the plurality of vehicles responsive to a receipt of at least the data representative of the one or more environmental factors from each respective one of the remaining plurality of vehicles.

Example 15 may include elements of any of examples 12 through 14, and may additionally include a geolocation sensor that may acquire at least data representative of a geolocation logically associated with each respective one of the plurality of vehicles, where the route guidance state machine may further generate one or more route guidance outputs in the first of the plurality of vehicles responsive to a receipt of at least the data representative of the geolocation of each respective one of the remaining plurality of vehicles.

Example 16 may include elements of example 12 where the first sensor may include at least one of: a heart rate measurement sensor; a body temperature sensor; a blood alcohol sensor; a respiration sensor, a skin conductivity sensor; a facial recognition sensor; a retinal sensor; a fingerprint sensor, a voice identification sensor, and a skin reflection sensor.

Example 17 may include elements of example 13 where the second sensor may include at least one of: a steering input sensor; an accelerator position sensor; a braking position sensor; a lateral acceleration sensor; a lane tracking sensor; an intra-vehicular distance sensor; and a linear acceleration sensor.

Example 18 may include elements of example 14 where the third sensor may include at least one of: a steering input sensor; an accelerator position sensor; a braking position sensor; a lateral acceleration sensor; a lane tracking sensor; an intra-vehicular distance sensor; and a linear acceleration sensor.

Example 19 may include elements of example 12, and may additionally include at least one communication interface.

Example 20 may include elements of example 19 where the route guidance state machine is disposed remote from all of the plurality of vehicles.

Example 21 may include elements of example 19 where the route guidance state machine may include a plurality of distributed circuits each providing a portion of the route guidance state machine, each of the plurality of distributed circuits disposed in a respective one of the plurality of vehicles.

According to example 22 there is provided a route guidance method. The method may include generating, via one or more biometric sensors, a first signal that may include data or information representative of at least one of a physical factor or a psychological factor logically associated with a respective occupant in each one of a plurality of vehicles. The method may further include receiving the first signal from each of the plurality of vehicles at a route guidance state machine and generating, via the route guidance state machine, a route guidance output for a first of the plurality of vehicles responsive to the receipt of at least one of: the one or more physical factors or the one or more psychological factors associated with a respective operator in each of the remaining plurality of vehicles.

Example 23 may include elements of example 22 where generating, via one or more biometric sensors, a first signal that may include data or information representative of at least one of a physical factor or a psychological factor may include generating, via one or more biometric sensors including at least one of: a heart rate sensor, a body temperature sensor, a blood alcohol sensor, a respiration sensor, a skin conductivity sensor, a blood pressure sensor, a facial recognition sensor, a retina scanner, a fingerprint scanner, a voice identification sensor, or a skin reflection sensor, the first signal that includes data or information representative of at least one of the physical factor or the psychological factor.

Example 24 may include elements of example 22 where generating, via one or more biometric sensors, a first signal that includes data or information representative of at least one of a physical factor or a psychological factor logically associated with a respective occupant in each one of a plurality of vehicles may include generating, via one or more biometric sensors, a first signal that includes data or information representative of at least one of a physical factor or a psychological factor logically associated with a respective vehicle operator in each one of a plurality of vehicles.

Example 25 may include elements of example 24 where generating, via one or more biometric sensors, a first signal that includes data or information representative of at least one of a physical factor or a psychological factor logically associated with a respective occupant in each one of a plurality of vehicles may further include generating, via one or more biometric sensors, a first signal that includes data or information representative of at least one of a physical factor or a psychological factor logically associated with a respective passenger in each one of a plurality of vehicles.

Example 26 may include elements of example 22, and may additionally include generating, via one or more vehicular sensors, a second signal that includes data or information representative of at least one vehicular factor logically associated with each respective one of a plurality of vehicles, receiving the second signal from each of the plurality of vehicles at a route guidance state machine, and generating, via the route guidance state machine, a route guidance output for the first of the plurality of vehicles responsive to the receipt of the at least one vehicular factor logically associated with each of the remaining plurality of vehicles.

Example 27 may include elements of example 26 where generating, via one or more vehicular sensors, a second signal that includes data or information representative of at least one vehicular factor may include generating, via one or more vehicular sensors including at least one of: a steering input sensor, an accelerator position sensor, a braking position sensor, a lateral accelerometer, a lane tracking sensor, a lane departure sensor, an intra-vehicle distance sensor, a blind spot sensor, a parking assist sensor, or a linear accelerometer, that includes data or information representative of the at least one vehicular factor.

Example 28 may include elements of example 26, and may additionally include generating, via one or more ambient environment sensors, a third signal that includes data or information representative of at least one ambient environmental factor logically associated with each respective one of a plurality of vehicles, receiving the third signal from each of the plurality of vehicles at a route guidance state machine, and generating, via the route guidance state machine, a route guidance output for the first of the plurality of vehicles responsive to the receipt of the at least one ambient environmental factor logically associated with each of the remaining plurality of vehicles.

Example 29 may include elements of example 28 where generating, via one or more ambient environment sensors, a third signal that includes data or information representative of at least one ambient environmental factor logically associated with each respective one of a plurality of vehicles may include generating, via one or more ambient environment sensors that include at least one of: an ambient temperature sensor, a humidity sensor, a road surface condition sensor, an ambient light sensor, or a road composition sensor, a third signal that includes data or information representative of at least one ambient environmental factor logically associated with each respective one of a plurality of vehicles.

Example 30 may include elements of any of examples 22 through 29, and may additionally include generating, via one or more vehicular sensors, a geolocation signal that includes data or information representative of a geolocation logically associated with each respective one of a plurality of vehicles, receiving the geolocation signal from each of the plurality of vehicles at a route guidance state machine, and generating, via the route guidance state machine, a route guidance output for the first of the plurality of vehicles responsive to the receipt of the geolocation logically associated with each of the remaining plurality of vehicles.

Example 31 may include elements of any of examples 22 through 29 where generating, via the route guidance state machine, a route guidance output may include generating, via a network connected route guidance state machine, the route guidance output and communicating the generated route guidance output to the first of the plurality of vehicles.

Example 32 may include elements of any of examples 22 through 29 where generating, via the route guidance state machine, a route guidance output may include generating, via a plurality of circuits that collectively provide the route guidance state machine, each of the plurality of circuits disposed in a respective one of the plurality of vehicles and communicating the generated route guidance output to the first of the plurality of vehicles.

According to Example 33, there is provided a route guidance system. The system may include a means for generating a first signal that includes data or information representative of at least one of a physical factor or a psychological factor logically associated with a respective occupant in each one of a plurality of vehicles. The system may further include a means for receiving the first signal from each of the plurality of vehicles and a means for generating a route guidance output for a first of the plurality of vehicles responsive to the receipt of at least one of: the one or more physical factors or the one or more psychological factors associated with a respective operator in each of the remaining plurality of vehicles.

Example 34 may include elements of example 33, and may additionally include a means for generating a second signal that includes data or information representative of at least one vehicular factor logically associated with each respective one of a plurality of vehicles, a means for receiving the second signal from each of the plurality of vehicles, and a means for generating a route guidance output for the first of the plurality of vehicles responsive to the receipt of the at least one vehicular factor logically associated with each of the remaining plurality of vehicles.

Example 35 may include elements of example 34, and may additionally include a means for generating a third signal that includes data or information representative of at least one ambient environmental factor logically associated with each respective one of a plurality of vehicles, a means for receiving the third signal from each of the plurality of vehicles, and a means for generating a route guidance output for the first of the plurality of vehicles responsive to the receipt of the at least one ambient environmental factor logically associated with each of the remaining plurality of vehicles.

Example 36 may include elements of any of examples 33 through 35, and may additionally include a means for generating a geolocation signal that includes data or information representative of a geolocation logically associated with each respective one of a plurality of vehicles, a means for receiving the geolocation signal from each of the plurality of vehicles, and a means for generating a route guidance output for the first of the plurality of vehicles responsive to the receipt of the geolocation logically associated with each of the remaining plurality of vehicles.

According to Example 37, there is provided a controller. The controller may include at least one controller circuit. The controller may additionally include at least one storage device communicably coupled to the at least one controller circuit, the at least one storage device including machine-executable instructions that, when executed by the at least one controller circuit, cause the at least one controller circuit to provide a route guidance state machine, the route guidance state machine to: cause one or more biometric sensors to provide a first signal that includes data or information representative of at least one of a physical factor or a psychological factor logically associated with a respective occupant in each one of a plurality of vehicles, receive the first signal from each of the plurality of vehicles at a route guidance state machine, and generate a route guidance output for a first of the plurality of vehicles responsive to the receipt of at least one of: the one or more physical factors or the one or more psychological factors associated with a respective operator in each of the remaining plurality of vehicles.

Example 38 may include elements of example 37 where the machine-executable instructions that cause the route guidance state machine to cause the one or more biometric sensors to provide a first signal that includes data or information representative of at least one of a physical factor or a psychological factor, may further cause the route guidance state machine to cause the one or more biometric sensors including at least one of: a heart rate sensor, a body temperature sensor, a blood alcohol sensor, a respiration sensor, a skin conductivity sensor, a blood pressure sensor, a facial recognition sensor, a retina scanner, a fingerprint scanner, a voice identification sensor, or a skin reflection sensor, to provide the first signal that includes data or information representative of at least one of the physical factor or the psychological factor.

Example 39 may include elements of example 37 where the machine-executable instructions that cause the route guidance state machine to cause the one or more biometric sensors to provide a first signal that includes data or information representative of at least one of a physical factor or a psychological factor logically associated with a respective occupant in each one of a plurality of vehicles, may further cause the route guidance state machine to cause the one or more biometric sensors to provide a first signal that includes data or information representative of at least one of a physical factor or a psychological factor logically associated with a respective vehicle operator in each one of a plurality of vehicles.

Example 40 may include elements of example 39 where the machine-executable instructions that cause the route guidance state machine to cause the one or more biometric sensors to provide a first signal that includes data or information representative of at least one of a physical factor or a psychological factor logically associated with a respective occupant in each one of a plurality of vehicles, may further cause the route guidance state machine to cause the one or more biometric sensors to provide a first signal that includes data or information representative of at least one of a physical factor or a psychological factor logically associated with a respective passenger in each one of a plurality of vehicles.

Example 41 may include elements of example 37 where the machine-executable instructions may further cause the route guidance state machine to cause one or more vehicular sensors to provide a second signal that includes data or information representative of at least one vehicular factor logically associated with each respective one of a plurality of vehicles, receive the second signal from each of the plurality of vehicles at a route guidance state machine, and generate a route guidance output for the first of the plurality of vehicles responsive to the receipt of the at least one vehicular factor logically associated with each of the remaining plurality of vehicles.

Example 42 may include elements of example 41 where the machine-executable instructions that cause the route guidance state machine to cause the one or more vehicular sensors to provide a second signal that includes data or information representative of at least one vehicular factor, may further cause the route guidance state machine to cause the one or more vehicular sensors to provide a second signal that includes data or information representative of at least one vehicular factor, the one or more vehicular sensors including at least one of: a steering input sensor, an accelerator position sensor, a braking position sensor, a lateral accelerometer, a lane tracking sensor, a lane departure sensor, an intra-vehicle distance sensor, a blind spot sensor, a parking assist sensor, or a linear accelerometer.

Example 43 may include elements of example 37 where the machine-executable instructions may further cause the route guidance state machine to cause one or more ambient environmental sensors to provide a third signal that includes data or information representative of at least one ambient environmental factor logically associated with each respective one of a plurality of vehicles, receive the third signal from each of the plurality of vehicles at a route guidance state machine, and generate a route guidance output for the first of the plurality of vehicles responsive to the receipt of the at least one ambient environmental factor logically associated with each of the remaining plurality of vehicles.

Example 44 may include elements of example 43 where the machine-executable instructions that cause the route guidance state machine to cause the one or more ambient environmental sensors to provide a third signal that includes data or information representative of at least one ambient environmental factor logically associated with each respective one of a plurality of vehicles, may further causes the route guidance state machine to cause the one or more ambient environmental sensors to provide a third signal that includes data or information representative of at least one ambient environmental factor logically associated with each respective one of a plurality of vehicles, the one or more ambient environment sensors include at least one of: an ambient temperature sensor, a humidity sensor, a road surface condition sensor, an ambient light sensor, or a road composition sensor.

Example 45 may include elements of any of examples 37 through 44 where the machine-executable instructions may further cause the route guidance state machine to cause one or more geolocation sensors to provide a geolocation signal that includes data or information representative of a geolocation logically associated with each respective one of a plurality of vehicles, receive the geolocation signal from each of the plurality of vehicles at a route guidance state machine and generate a route guidance output for the first of the plurality of vehicles responsive to the receipt of the geolocation data logically associated with each of the remaining plurality of vehicles.

Example 46 may include elements of any of examples 37 through 44 where the machine-executable instructions that cause the route guidance state machine to generate a route guidance output, may further cause the route guidance state machine to generate the route guidance output and communicate the generated route guidance output to the first of the plurality of vehicles.

According to Example 47, there is provided a storage device that includes machine-readable instructions. The machine-readable instructions, when executed by a controller, cause the controller to provide a route guidance state machine. The route guidance state machine may cause one or more biometric sensors to provide a first signal that includes data or information representative of at least one of a physical factor or a psychological factor logically associated with a respective occupant in each one of a plurality of vehicles. The route guidance state machine may receive the first signal from each of the plurality of vehicles at a route guidance state machine and generate a route guidance output for a first of the plurality of vehicles responsive to the receipt of at least one of: the one or more physical factors or the one or more psychological factors associated with a respective operator in each of the remaining plurality of vehicles.

Example 48 may include elements of example 47 where the machine-readable instructions that cause the route guidance state machine to cause the one or more biometric sensors to provide a first signal that includes data or information representative of at least one of a physical factor or a psychological factor, may further cause the route guidance state machine to cause the one or more biometric sensors including at least one of: a heart rate sensor, a body temperature sensor, a blood alcohol sensor, a respiration sensor, a skin conductivity sensor, a blood pressure sensor, a facial recognition sensor, a retina scanner, a fingerprint scanner, a voice identification sensor, or a skin reflection sensor, to provide the first signal that includes data or information representative of at least one of the physical factor or the psychological factor.

Example 49 may include elements of example 47 where the machine-readable instructions that cause the route guidance state machine to cause the one or more biometric sensors to provide a first signal that includes data or information representative of at least one of a physical factor or a psychological factor logically associated with a respective occupant in each one of a plurality of vehicles, may further cause the route guidance state machine to cause the one or more biometric sensors to provide a first signal that includes data or information representative of at least one of a physical factor or a psychological factor logically associated with a respective vehicle operator in each one of a plurality of vehicles.

Example 50 may include elements of example 49 where the machine-readable instructions that cause the route guidance state machine to cause the one or more biometric sensors to provide a first signal that includes data or information representative of at least one of a physical factor or a psychological factor logically associated with a respective occupant in each one of a plurality of vehicles, may further cause the route guidance state machine to cause the one or more biometric sensors to provide a first signal that includes data or information representative of at least one of a physical factor or a psychological factor logically associated with a respective passenger in each one of a plurality of vehicles.

Example 51 may include elements of example 47 where the machine-readable instructions may further cause the route guidance state machine to cause one or more vehicular sensors to provide a second signal that includes data or information representative of at least one vehicular factor logically associated with each respective one of a plurality of vehicles, receive the second signal from each of the plurality of vehicles at a route guidance state machine, and generate a route guidance output for the first of the plurality of vehicles responsive to the receipt of the at least one vehicular factor logically associated with each of the remaining plurality of vehicles.

Example 52 may include elements of example 51 where the machine-readable instructions that cause the route guidance state machine to cause the one or more vehicular sensors to provide a second signal that includes data or information representative of at least one vehicular factor, may further cause the route guidance state machine to cause the one or more vehicular sensors to provide a second signal that includes data or information representative of at least one vehicular factor, the one or more vehicular sensors including at least one of: a steering input sensor, an accelerator position sensor, a braking position sensor, a lateral accelerometer, a lane tracking sensor, a lane departure sensor, an intra-vehicle distance sensor, a blind spot sensor, a parking assist sensor, or a linear accelerometer.

Example 53 may include elements of example 47 where the machine-readable instructions may further cause the route guidance state machine to cause one or more ambient environmental sensors to provide a third signal that includes data or information representative of at least one ambient environmental factor logically associated with each respective one of a plurality of vehicles. The route guidance state machine may further receive the third signal from each of the plurality of vehicles at a route guidance state machine and generate a route guidance output for the first of the plurality of vehicles responsive to the receipt of the at least one ambient environmental factor logically associated with each of the remaining plurality of vehicles.

Example 54 may include elements of example 53 where the machine-readable instructions that cause the route guidance state machine to cause the one or more ambient environmental sensors to provide a third signal that includes data or information representative of at least one ambient environmental factor logically associated with each respective one of a plurality of vehicles, may further cause the route guidance state machine to cause the one or more ambient environmental sensors to provide a third signal that includes data or information representative of at least one ambient environmental factor logically associated with each respective one of a plurality of vehicles, the one or more ambient environment sensors include at least one of: an ambient temperature sensor, a humidity sensor, a road surface condition sensor, an ambient light sensor, or a road composition sensor.

Example 55 may include elements of any of examples 47 through 54 where the machine-readable instructions may further cause the route guidance state machine to cause one or more geolocation sensors to provide a geolocation signal that includes data or information representative of a geolocation logically associated with each respective one of a plurality of vehicles. The route guidance state machine may further receive the geolocation signal from each of the plurality of vehicles at a route guidance state machine and generate a route guidance output for the first of the plurality of vehicles responsive to the receipt of the geolocation data logically associated with each of the remaining plurality of vehicles.

Example 56 may include elements of any of examples 47 through 54 where the machine-readable instructions that cause the route guidance state machine to generate a route guidance output, may further cause the route guidance state machine to generate the route guidance output; and communicate the generated route guidance output to the first of the plurality of vehicles.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:
1. A route guidance system, comprising:
a first sensor to acquire at least data representative of at least one of: a physical factor or a psychological factor logically associated with a respective occupant of each of a plurality of vehicles, wherein when the first sensor includes at least one image acquisition device in a vehicle corresponding to a respective occupant, the first sensor is configured to address privacy concerns of the respective occupant by analyzing image data acquired by the at least one image acquisition device using at least one on-board processor-based device disposed in the corresponding vehicle;
a route guidance state machine that generates one or more route guidance outputs in a first of the plurality of vehicles responsive to a receipt of at least the data indicative of at least one of: the one or more physical factors or the one or more psychological factors associated with a respective vehicle operator in each of the remaining plurality of vehicles.

2. The route guidance system of claim 1, further comprising:
a second sensor to acquire at least data representative of one or more vehicular factors logically associated with each respective one of the plurality of vehicles;
wherein the route guidance state machine further generates one or more route guidance outputs in the first of the plurality of vehicles responsive to a receipt of at least the data representative of the one or more vehicular factors from each respective one of the remaining plurality of vehicles.

3. The route guidance system of claim 2 wherein the second sensor comprises at least one of: a steering input sensor; an accelerator position sensor; a braking position sensor; a lateral acceleration sensor; a lane tracking sensor; an intra-vehicular distance sensor; and a linear acceleration sensor.

4. The route guidance system of claim 2, further comprising:
a third sensor to acquire at least data representative of one or more environmental factors external to and logically associated with each respective one of the plurality of vehicles;
wherein the route guidance state machine further generates one or more route guidance outputs in the first of the plurality of vehicles responsive to a receipt of at least the data representative of the one or more environmental factors from each respective one of the remaining plurality of vehicles.

5. The route guidance system of claim 4 wherein the third sensor comprises at least one of: a steering input sensor; an accelerator position sensor; a braking position sensor; a lateral acceleration sensor; a lane tracking sensor; an intra-vehicular distance sensor; and a linear acceleration sensor.

6. The route guidance system of claim 1, further comprising:
a geolocation sensor to acquire at least data representative of a geolocation logically associated with each respective one of the plurality of vehicles;
wherein the route guidance state machine further generates one or more route guidance outputs in the first of the plurality of vehicles responsive to a receipt of at least the data representative of the geolocation of each respective one of the remaining plurality of vehicles.

7. The route guidance system of claim 1 wherein the first sensor comprises at least one of: a heart rate measurement sensor; a body temperature sensor; a blood alcohol sensor; a respiration sensor, a skin conductivity sensor; a facial recognition sensor; a retinal sensor; a fingerprint sensor, a voice identification sensor, and a skin reflection sensor.

8. The route guidance system of claim 1, further comprising at least one communication interface.

9. The route guidance system of claim 8 wherein the route guidance state machine is disposed remote from all of the plurality of vehicles.

10. The route guidance system of claim 8 wherein the route guidance state machine comprises a plurality of distributed circuits each providing a portion of the route guidance state machine, each of the plurality of distributed circuits disposed in a respective one of the plurality of vehicles.

11. A route guidance method comprising:
generating, via one or more biometric sensors, a first signal that includes data or information representative of at least one of a physical factor or a psychological factor logically associated with a respective occupant in each one of a plurality of vehicles, wherein when the one or more biometric sensor includes at least one image acquisition device in a vehicle corresponding to a respective occupant, the one or more biometric sensors are configured to address privacy concerns of the respective occupant by analyzing image data acquired by the at least one image acquisition device using at least one on-board processor-based device disposed in the corresponding vehicle;
receiving the first signal from each of the plurality of vehicles at a route guidance state machine; and
generating, via the route guidance state machine, a route guidance output for a first of the plurality of vehicles responsive to the receipt of at least one of: the one or more physical factors or the one or more psychological factors associated with a respective vehicle operator in each of the remaining plurality of vehicles.

12. The route guidance method of claim 11 wherein generating, via one or more biometric sensors, a first signal that includes data or information representative of at least one of a physical factor or a psychological factor comprises:
generating, via one or more biometric sensors including at least one of: a heart rate sensor, a body temperature sensor, a blood alcohol sensor, a respiration sensor, a skin conductivity sensor, a blood pressure sensor, a facial recognition sensor, a retina scanner, a fingerprint scanner, a voice identification sensor, or a skin reflection sensor, the first signal that includes data or information representative of at least one of the physical factor or the psychological factor.

13. The route guidance method of claim 11 wherein generating, via one or more biometric sensors, a first signal that includes data or information representative of at least one of a physical factor or a psychological factor logically associated with a respective occupant in each one of a plurality of vehicles comprises:
generating, via one or more biometric sensors, a first signal that includes data or information representative of at least one of a physical factor or a psychological factor logically associated with a respective vehicle operator in each one of a plurality of vehicles.

14. The route guidance method of claim 13 wherein generating, via one or more biometric sensors, a first signal that includes data or information representative of at least one of a physical factor or a psychological factor logically associated with a respective occupant in each one of a plurality of vehicles further comprises:
generating, via one or more biometric sensors, a first signal that includes data or information representative of at least one of a physical factor or a psychological factor logically associated with a respective passenger in each one of a plurality of vehicles.

15. The route guidance method of claim 11, further comprising:
generating, via one or more vehicular sensors, a second signal that includes data or information representative of at least one vehicular factor logically associated with each respective one of a plurality of vehicles;
receiving the second signal from each of the plurality of vehicles at a route guidance state machine; and
generating, via the route guidance state machine, a route guidance output for the first of the plurality of vehicles responsive to the receipt of the at least one vehicular factor logically associated with each of the remaining plurality of vehicles.

16. The route guidance method of claim 15 wherein generating, via one or more vehicular sensors, a second signal that includes data or information representative of at least one vehicular factor comprises:
generating, via one or more vehicular sensors including at least one of: a steering input sensor, an accelerator position sensor, a braking position sensor, a lateral accelerometer, a lane tracking sensor, a lane departure sensor, an intra-vehicle distance sensor, a blind spot sensor, a parking assist sensor, or a linear accelerometer, that includes data or information representative of the at least one vehicular factor.

17. The route guidance method of claim 15, further comprising:
generating, via one or more ambient environment sensors, a third signal that includes data or information representative of at least one ambient environmental factor logically associated with each respective one of a plurality of vehicles;

receiving the third signal from each of the plurality of vehicles at a route guidance state machine; and generating, via the route guidance state machine, a route guidance output for the first of the plurality of vehicles responsive to the receipt of the at least one ambient environmental factor logically associated with each of the remaining plurality of vehicles.

18. The route guidance method of claim 17 wherein generating, via one or more ambient environment sensors, a third signal that includes data or information representative of at least one ambient environmental factor logically associated with each respective one of a plurality of vehicles comprises:

generating, via one or more ambient environment sensors that include at least one of: an ambient temperature sensor, a humidity sensor, a road surface condition sensor, an ambient light sensor, or a road composition sensor, a third signal that includes data or information representative of at least one ambient environmental factor logically associated with each respective one of a plurality of vehicles.

19. The route guidance method of claim 11, further comprising:

generating, via one or more vehicular sensors, a geolocation signal that includes data or information representative of a geolocation logically associated with each respective one of a plurality of vehicles;

receiving the geolocation signal from each of the plurality of vehicles at a route guidance state machine; and generating, via the route guidance state machine, a route guidance output for the first of the plurality of vehicles responsive to the receipt of the geolocation logically associated with each of the remaining plurality of vehicles.

20. The route guidance method of claim 11 wherein generating, via the route guidance state machine, a route guidance output comprises:

generating, via a network connected route guidance state machine, the route guidance output; and communicating the generated route guidance output to the first of the plurality of vehicles.

21. The route guidance method of claim 11 wherein generating, via the route guidance state machine, a route guidance output comprises:

generating, via a plurality of circuits that collectively provide the route guidance state machine, each of the plurality of circuits disposed in a respective one of the plurality of vehicles; and communicating the generated route guidance output to the first of the plurality of vehicles.

22. A route guidance system comprising:

a means for generating a first signal that includes data or information representative of at least one of a physical factor or a psychological factor logically associated with a respective occupant in each one of a plurality of vehicles, wherein when the first sensor includes at least one image acquisition device in a vehicle corresponding to a respective occupant, the first sensor is configured to address privacy concerns of the respective occupant by analyzing image data acquired by the at least one image acquisition device using at least one on-board processor-based device disposed in the corresponding vehicle;

a means for receiving the first signal from each of the plurality of vehicles; and a means for generating a route guidance output for a first of the plurality of vehicles responsive to the receipt of at least one of: the one or more physical factors or the one or more psychological factors associated with a respective vehicle operator in each of the remaining plurality of vehicles.

23. The route guidance system of claim 22, further comprising:

a means for generating a second signal that includes data or information representative of at least one vehicular factor logically associated with each respective one of a plurality of vehicles;

a means for receiving the second signal from each of the plurality of vehicles; and a means for generating a route guidance output for the first of the plurality of vehicles responsive to the receipt of the at least one vehicular factor logically associated with each of the remaining plurality of vehicles.

24. The route guidance system of claim 23, further comprising:

a means for generating a third signal that includes data or information representative of at least one ambient environmental factor logically associated with each respective one of a plurality of vehicles;

a means for receiving the third signal from each of the plurality of vehicles; and a means for generating a route guidance output for the first of the plurality of vehicles responsive to the receipt of the at least one ambient environmental factor logically associated with each of the remaining plurality of vehicles.

25. The route guidance system of claim 22, further comprising:

a means for generating a geolocation signal that includes data or information representative of a geolocation logically associated with each respective one of a plurality of vehicles;

a means for receiving the geolocation signal from each of the plurality of vehicles; and a means for generating a route guidance output for the first of the plurality of vehicles responsive to the receipt of the geolocation logically associated with each of the remaining plurality of vehicles.

* * * * *